US011075921B2

(12) United States Patent
Templin

(10) Patent No.: US 11,075,921 B2
(45) Date of Patent: Jul. 27, 2021

(54) SYSTEMS AND METHODS FOR AUTOMATICALLY REGISTERING A MOBILE ROUTER IN A SERVICE NETWORK

(71) Applicant: The Boeing Company, Chicago, IL (US)

(72) Inventor: Fred L. Templin, North Bend, WA (US)

(73) Assignee: The Boeing Company, Chicago, IL (US)

( * ) Notice: Subject to any disclaimer, the term of this patent is extended or adjusted under 35 U.S.C. 154(b) by 316 days.

(21) Appl. No.: 16/284,647

(22) Filed: Feb. 25, 2019

(65) Prior Publication Data

US 2020/0274882 A1    Aug. 27, 2020

(51) Int. Cl.
*H04L 29/06* (2006.01)
*H04L 29/12* (2006.01)
*H04L 29/08* (2006.01)

(52) U.S. Cl.
CPC ........ *H04L 63/107* (2013.01); *H04L 61/2038* (2013.01); *H04L 63/0876* (2013.01); *H04L 67/16* (2013.01); *H04L 61/6004* (2013.01)

(58) Field of Classification Search
None
See application file for complete search history.

(56) References Cited

PUBLICATIONS

Network Working Group, "Neighbor Discovery for IP version 6 (IPv6)", T. Narten et al., Sep. 2007, 91 pages.
Network Working Group, "Dynamic Host Configuration Protocol for IPv6 (DHCPv6)", R. Droms, Ed. et al., Jul. 2003, 95 pages.
Network Working Group, "The AERO Address", F. Templin, Ed., Jun. 2017, 5 pages.
Network Working Group, "A Unified Stateful/Stateless Configuration Service for IPv6", F. Templin, Ed., Dec. 2018, 14 pages.

*Primary Examiner* — Esther B. Henderson
(74) *Attorney, Agent, or Firm* — McDonnell Boehnen Hulbert & Berghoff LLP

(57) ABSTRACT

In an example, a method is described that comprises forming an MNP uniquely associated with the client aircraft. The method comprises embedding the MNP in a source address. The method additionally comprises sending a router solicitation message to a fixed router in a ground service network, wherein the router solicitation message comprises the source address. The method also comprises receiving, by the mobile router of the client aircraft from the fixed router in the ground service network, a router advertisement message, wherein the router advertisement message comprises configuration information for subsequent communications between the mobile router of the client aircraft and the fixed router. The method still further comprises determining, by the mobile router of the client aircraft, based on receiving the router advertisement message, that (i) the MNP of the client aircraft has been delegated and (ii) the client aircraft has permission to communicate over the ground service network.

21 Claims, 13 Drawing Sheets

SYSTEMS AND METHODS FOR AUTOMATICALLY REGISTERING A MOBILE ROUTER IN A SERVICE NETWORK

FIELD

The present disclosure relates generally to the automatic registration of mobile routers into a service network, and in a reference example, to methods and systems for automatically configuring communications between a client aircraft and the ground service network.

BACKGROUND

An aircraft or an airplane may communicate with nodes in a ground service network several times a day. Several aircraft might communicate with nodes in the ground service network at the same time, causing network congestion and interference. The means for admitting an aircraft into the service network must therefore exclude unauthorized access.

Existing modes for communicating between an aircraft and a ground node involve many sets of communications between a node of the aircraft and the ground node to configure future communications. These additional sets of communications may cause a delay in sending substantive communications between the nodes and increase computing power required to facilitate the communications.

What is needed is a system that can automatically and efficiently configure communications between an aircraft and the ground service network.

SUMMARY

In an example, a method for automatically configuring communications between a client aircraft and a ground service network is described. The method comprises forming a Mobile Network Prefix (MNP) uniquely associated with the client aircraft, wherein forming the MNP comprises combining (i) a Mobility Service Prefix (MSP) associated with the ground service network, and (ii) a unique aircraft identification number associated with the client aircraft. The method further comprises embedding, by the mobile router of the client aircraft, the MNP in a source address, wherein the source address corresponds to a protocol for communicating over the ground service network, and wherein corroboration of the unique aircraft identification number by one or more nodes in the ground service network indicates that the client aircraft has permission to communicate over the ground service network. The method additionally comprises sending, by a mobile router of the client aircraft, a router solicitation message to the ground service network, wherein the router solicitation message comprises the source address. The method also comprises receiving, by the mobile router of the client aircraft from a fixed router in the ground service network, a router advertisement message, wherein the router advertisement message comprises configuration information for subsequent communications between the mobile router of the client aircraft and nodes in the ground service network. The method still further comprises determining, by the mobile router of the client aircraft, based on receiving the router advertisement message, that (i) the MNP of the client aircraft has been delegated and (ii) the client aircraft has permission to communicate over the ground service network. The method also comprises sending, by the mobile router of the client aircraft, responsive to determining that the client aircraft has permission to communicate over the ground service network, a subsequent message to the fixed router in the ground service network in accordance with the configuration information of the router advertisement message.

In another example, a method for automatically configuring communications between a client aircraft and a ground service network is described. The method comprises receiving, by a fixed router in the ground service network from a mobile router of the client aircraft, a router solicitation message, wherein the router solicitation message comprises a source address corresponding to a protocol for communicating over the ground service network and having embedded therein an MNP formed by combining (i) a Mobility Service Prefix (MSP) associated with the ground service network, and (ii) a unique aircraft identification number associated with the client aircraft. The method further comprises delegating, by the fixed router in the ground service network, the MNP. The method further comprises corroborating, by one or more nodes in the ground service network, the unique aircraft identification number to determine that the client aircraft has permission to communicate over the ground service network. The method additionally comprises sending, by the fixed router of ground service network to the mobile router of the client aircraft, a router advertisement message, wherein the router advertisement message comprises configuration information for subsequent communications between the mobile router of the client aircraft and nodes in the ground service network, wherein receiving the router advertisement message by the mobile router of the client aircraft indicates that (i) the prefix has been delegated and (ii) the client aircraft has permission to communicate over the ground service network. The method also includes receiving, by the mobile router of the client aircraft, responsive to determining that the client aircraft has permission to communicate over the ground service network, a subsequent message to the fixed router in accordance with the configuration information of the router advertisement message.

In another example, a non-transitory computer readable medium is described. The non-transitory computer readable medium has stored thereon instructions, that when executed by one or more processors of a computing device, cause the computing device to perform functions. The functions comprise forming a Mobile Network Prefix (MNP) uniquely associated with a client aircraft, wherein forming the MNP comprises combining (i) a Mobility Service Prefix (MSP) associated with a ground service network, and (ii) a unique aircraft identification number associated with the client aircraft. The functions also comprise embedding, by a mobile router of the client aircraft, the MNP in a source address, wherein the source address corresponds to a protocol for communicating over the ground service network, and wherein corroboration of the unique aircraft identification number by one or more nodes in the ground service network indicates that the client aircraft has permission to communicate over the ground service network. The functions additionally comprise sending, by a mobile router of the client aircraft, a router solicitation message to the ground service network, wherein the router solicitation message comprises the source address. The functions also comprise receiving, by the mobile router of the client aircraft from a fixed router in the ground service network, a router advertisement message, wherein the router advertisement message comprises configuration information for subsequent communications between the mobile router of the client aircraft and nodes in the ground service network. The functions still further comprise determining, by the mobile router of the client aircraft, based on receiving the router advertisement message, that (i) the MNP of the client aircraft has been delegated and (ii) the client aircraft has permission to communicate over the ground service network. The functions also comprise sending, by the mobile router of the client aircraft, responsive to determining that the client aircraft has permission to communicate over the ground service network, a subsequent message to the fixed router in the ground service network in accordance with the configuration information of the router advertisement message.

In another example, a system for automatically configuring communications between a client aircraft and a ground service network is described. The system comprises a mobile router of the client aircraft, wherein the mobile router comprises a computing device having a processor and memory storing instructions executable by the processor to form a Mobile Network Prefix (MNP) uniquely associated with the client aircraft, wherein forming the MNP comprises combining (i) a Mobility Service Prefix (MSP) associated with the ground service network, and (ii) a unique aircraft identification number associated with the client aircraft. The instructions are further executable by the processor to embed the MNP in a source address, wherein the source address corresponds to a protocol for communicating over the ground service network, and wherein corroboration of the unique aircraft identification number by one or more nodes in the ground service network indicates that the client aircraft has permission to communicate over the ground service network. The instructions are further executable by the processor to send a router solicitation message to a fixed router of the ground service network, wherein the router solicitation message comprises the source address. The instructions are further executable by the processor to receive, from the fixed router in the ground service network, a router advertisement message, wherein the router advertisement message comprises configuration information for subsequent communications between the mobile router of the client aircraft and nodes in the ground service network. The instructions are further executable by the processor to determine, based on receiving the router advertisement message, that (i) the MNP of the client aircraft has been delegated and (ii) the client aircraft has permission to communicate over the ground service network. The instructions are further executable by the processor to send, responsive to determining that the client aircraft has permission to communicate over the ground service network, a subsequent message to the fixed router in the ground service network in accordance with the configuration information of the router advertisement message.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
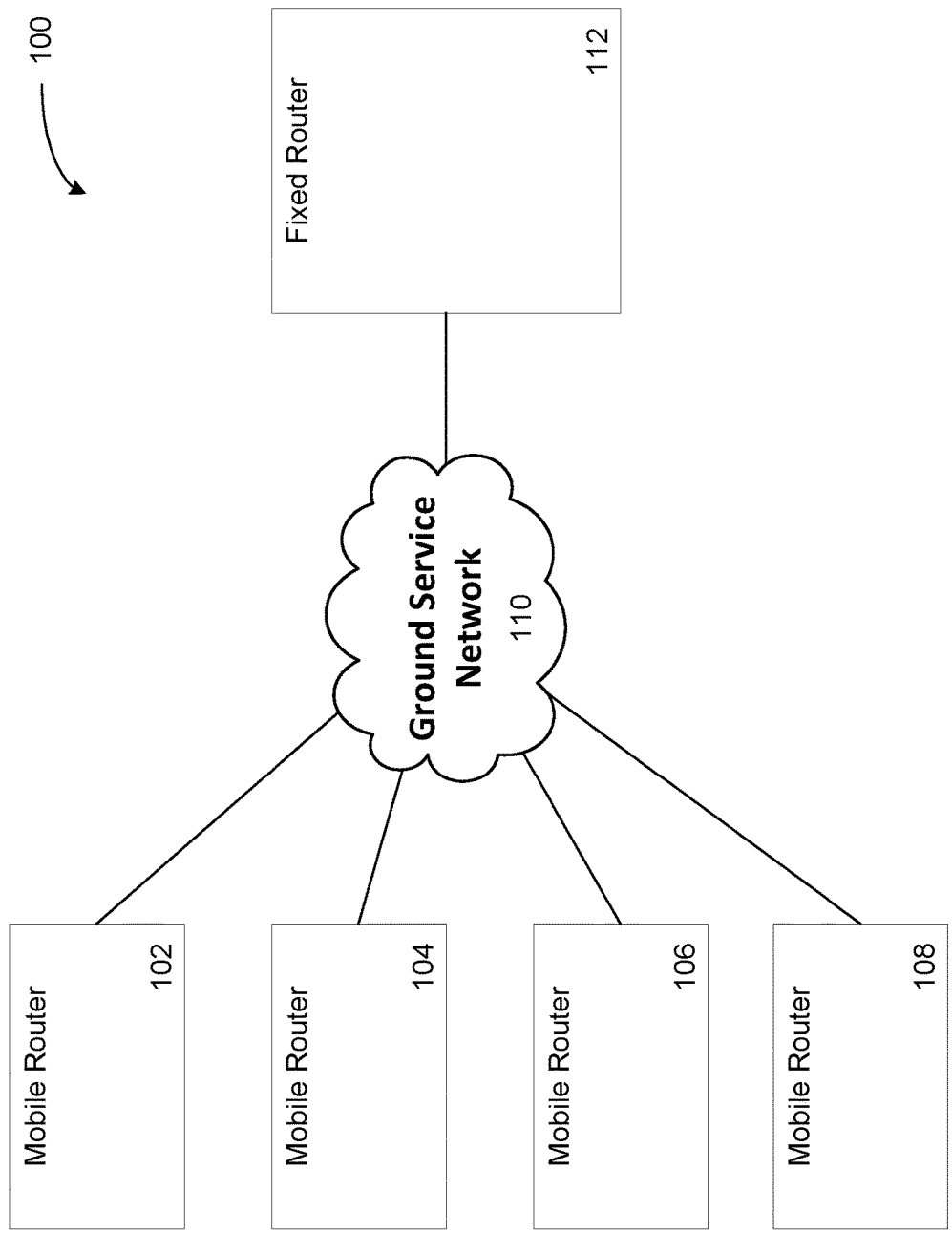
FIG. 1 illustrates a block diagram of an example system, according to an example implementation.

Disclosed examples will now be described more fully hereinafter with reference to the accompanying drawings, in which some, but not all of the disclosed examples are shown.

Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for automatically configuring communications between a client aircraft and a ground service network are described. More specifically, systems and methods are described that facilitate efficient communication between a mobile router in a client aircraft and a ground node, such as an ground service network. The mobile router is configured to embed an MNP into the source address of a router solicitation message, by which the mobile router invites a response from a fixed router in the ground service network. The mobile router can then receive a responsive router advertisement message from the fixed router that configures future communications between the mobile router and the ground service network.

Example systems and methods may reduce communications between a client aircraft and the ground service network. For instance, embedding an MNP with a unique aircraft identification number allows the ground service network to use Prefix Delegation (PD) to delegate the MNP, where PD entails network admission and a representation of the MNP in a routing system of the ground service network. Using PD to delegate the MNP allows a fixed router in the ground service network to serve as a delegating router that automates assigning prefixes to a requesting router, such as the mobile router of the client aircraft. Embedding the MNP may also allow the ground service network to corroborate the unique aircraft identification number with a database of such identification numbers. Corroborating the identification number allows the ground service network to determine that the client aircraft has permissions to communicate over the ground service network without further queries to the client aircraft. Thus, receiving the responsive router advertisement message confirms to the client aircraft that it may send further communications to nodes in the ground service network such as air traffic controllers.

Context-based protocols may similarly reduce the need for additional control messaging between the client aircraft and the ground service network. For example, the router solicitation message might be sent at a predetermined time, or within a predetermined proximity to an airport associated with the ground service network. In this manner, receiving the router solicitation message may indicate to ground service network that the client aircraft is requesting permission to renew its Mobile Network Prefix (MNP) registration. Other context-based communications are described further below. These scenarios further reduce the communications required between nodes in the ground service network, and thus increase efficiency of communications while reducing bandwidth usage and network congestion.

Within further examples, the mobile router of the client aircraft can facilitate Internet of Things (IoT) implementations for on-board networks. For instance, sensors and computing devices in the client aircraft can communicate in an intra-client aircraft network with the mobile router, which can allow for nodes in the ground service network to query specific sensors and computing devices in the client aircraft. This may allow for nodes in the ground service network to request only relevant information at a given time, and thus further reduce the data sent over the ground service network.

Though implementations in the context of a client aircraft and a ground service network are described herein, the forthcoming description is exemplary and can be implemented in other contexts as well. Within examples, the client might be a land vehicle, water vehicle, smart phone, or another mobile device configured to communicate over a network, and the mobile router can correspond to such devices. Similarly, a service network might be configured to communicate with any of such devices via a fixed router in the service network. In such implementations, a client may gain services from the service network through a mobile router. The service network may include one or more fixed routers that communicate with the mobile router associated with the client. The mobile router of the client may send a router solicitation message having an embedded MNP to a fixed router of the service network. The fixed router may extract the MNP from a source address of the router solicitation message, and may send a router advertisement message responsive to determining that the client has permission to communicate configuration information for subsequent communications between the mobile router of the client aircraft and nodes in the ground service network. The router advertisement message may include configuration information for subsequent communications between the mobile router of the client and nodes in the service network. The mobile router may receive the router advertisement message, and send a subsequent message to the fixed router in accordance with the configuration information.

Referring now to the figures, FIG. 1 illustrates a block diagram of an example of a system 100, according to an example implementation. The system 100 includes a plurality of mobile routers 102, 104, 106, and 108. The plurality of mobile routers 102, 104, 106, and 108 communicate over a ground service network 110 with a fixed router 112 in the ground service network 110.

Within examples, each of mobile routers 102, 104, 106, and 108 is associated with a corresponding client aircraft, and each of mobile routers 102, 104, 106, and 108 might communicate with the fixed router 112 over the ground service network 110. For instance, each corresponding client aircraft might be operating within the same service region fixed router 112 in the ground service network 110. In such instances, the mobile routers 102, 104, 106, and 108, as well as fixed routers corresponding to additional client aircraft, each configure communications with the fixed router 112. As noted above, reducing the number of messages used to configure each set of communications may significantly reduce bandwidth usage and congestion over the ground service network 110.

In order to configure communications with nodes in the ground service network 110, each of mobile routers 102, 104, 106, and 108 send a router solicitation message to the fixed router 112, and receive a router advertisement message from the fixed router 112 that contains configuration information for subsequent communications. Sending the router solicitation message involves embedding an MNP in a source address of the message. The MNP includes (i) an MSP of the ground service network 110, and (ii) a unique aircraft identification number associated with a client aircraft. Thus, each of mobile routers 102, 104, 106, and 108 communicates what type of node is sending the router solicitation message and what specific client aircraft is associated with the mobile router. The unique aircraft identification number is pre-assigned to each client aircraft and is corroborated by the fixed router 112 to establish that each given mobile router has permission to communicate over the ground service network 110. In addition, the mobile routers 102, 104, 106, and 108 are registered by fixed router 112, which includes delegating the MNP, using PD, in the source address of each respective mobile router. By delegating the MNP, the fixed router may confirm that the mobile router corresponding to the MNP has access to the ground service network 110 and provide a representation of the MNP in a routing system of the ground service network 110.

In examples, some mobile routers do not have permission to communicate over the ground service network 110, or have low priority for communicating over the ground service network 110. The fixed router 112 can determine this by extracting the unique aircraft identification numbers from the received router solicitation messages and comparing them to a database of known client aircraft identification numbers and permissions statuses. In the example illustrated in FIG. 1, the mobile router 104 is associated with a client aircraft that does not have permission to communicate over the ground service network 110, and the mobile router 106 has a low priority for communicating over the ground service network 110.

In the present example, the client aircraft associated with the mobile router 104 is not authorized to join the ground service network 110, and the fixed router 112 does not send a router advertisement message in response to receiving the router solicitation message. After a predetermined number of attempts (e.g. three attempts) to communicate with the ground service network 110 and waiting for a predetermined number of seconds between each attempt (e.g. three seconds) the mobile router 104 may determine that it does not have permission to communicate over the ground service network 110 based on not receiving the responsive router advertisement message. Likewise, the client aircraft associated with the mobile router 106 might be grounded or delayed, and thus would have a low priority for communicating over the ground service network 110. In this instance, the fixed router 112 might send a router advertisement message in response to receiving the router solicitation message that that advertises a low router preference as an indication to the mobile router 106 that it may receive a degraded level of service. Also in the present example, the client aircraft associated with the mobile router 102 may be approaching the airport in order to land, and so might be associated with a high priority. In this instance, the fixed router 112 might send a router advertisement message in response to receiving the router solicitation message that advertises a high router preference as an indication to the mobile router 106 that it may receive a preferred level of service. In this fashion communications might be prioritized over the ground service network 110 based on the context of each client aircraft associated with the mobile routers. Other context-based configurations of communications are described below.

The ground service network 110 may be a network associated with a destination airport of the client aircraft over which aircraft and ground nodes communicate. Nodes of the ground service network may facilitate registration of mobile routers and their corresponding aircraft. In alternative implementations, ground service network 110 may be another type of service network that facilitates communication of other types of mobile routers that correspond to land vehicles, water vehicles, smart phones, or other mobile devices.

Figure 2:
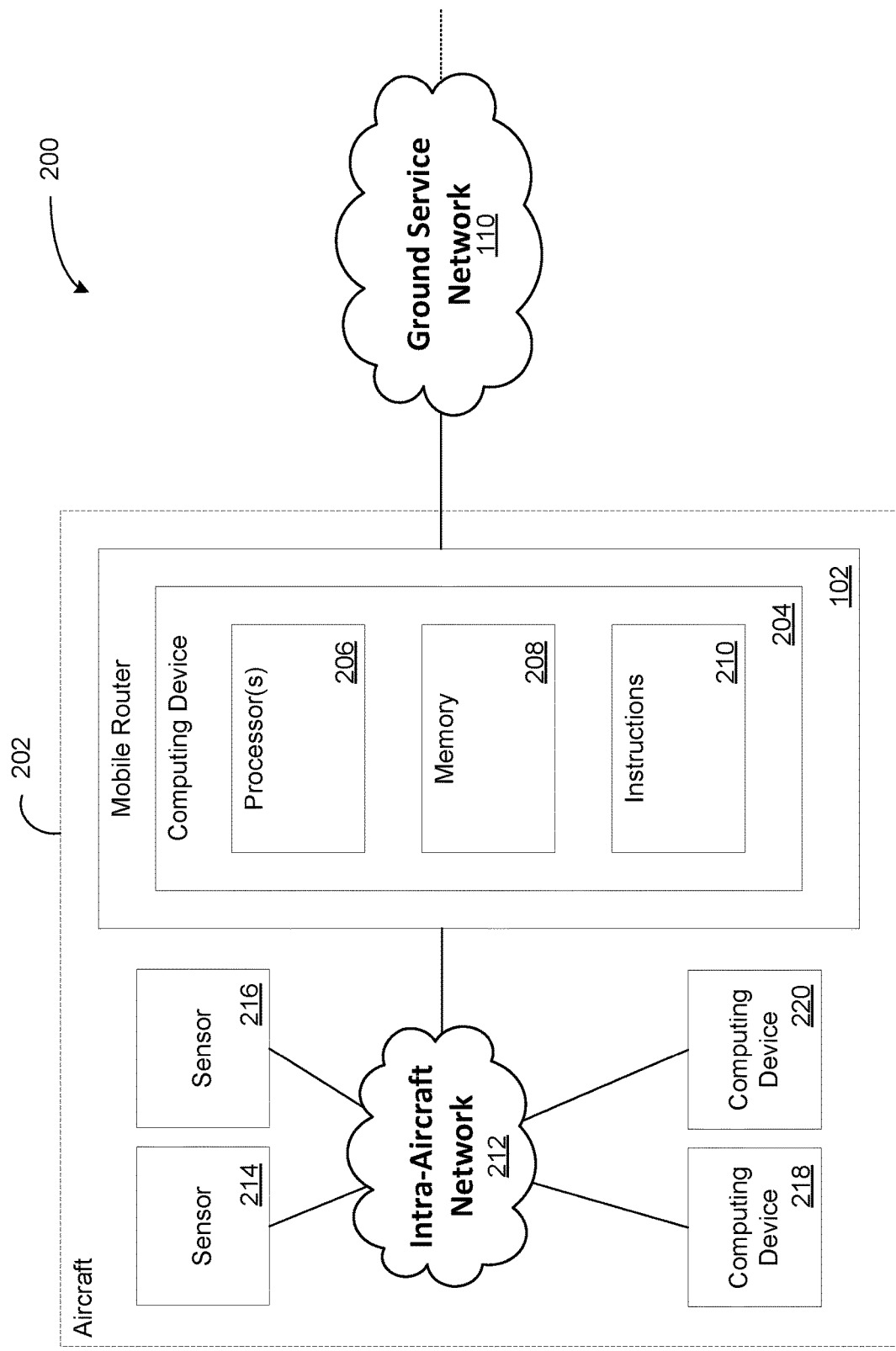
FIG. 2 illustrates a block diagram of another example system including a mobile router of a client aircraft, according to an example implementation.

FIG. 2 illustrates a block diagram of another example system 200 including a mobile router 102 of a client aircraft 202, according to an example implementation. In the present example, the mobile router 102 is included within the client aircraft 202. The mobile router 102 may be a communications module of the client aircraft 202, or another computing device configured for air-to-ground communications. The mobile router 102 includes a computing device 204, which in turn includes processor(s) 206, a memory 208, and instructions 210.

The memory 208 may include or take the form of one or more computer-readable storage media that can be read or accessed by the one or more processor(s) 206. The computer-readable storage media can include volatile and/or non-volatile storage components, such as optical, magnetic, organic or other memory or disc storage, which can be integrated in whole or in part with the processor(s) 206. The memory 208 is considered non-transitory computer readable media. In some examples, the memory 208 can be implemented using a single physical device (e.g., one optical, magnetic, organic or other memory or disc storage unit), while in other examples, the memory 208 can be implemented using two or more physical devices. The memory 208 thus is a non-transitory computer readable storage medium, and the instructions 210 are stored thereon. The instructions 210 include computer executable code that, when executed by the processor(s) 206, perform functions.

The one or more processor(s) 206 may be general-purpose processors or special purpose processors (e.g., digital signal processors, application specific integrated circuits, etc.). The processor(s) 206 may receive communications from fixed routers in the ground service network 110, process the communications, and send responsive communications. The one or more processor(s) 206 can be configured to execute the instructions 210 (e.g., computer-readable program instructions) that are stored in the memory 208 and are executable to provide the functionality of the mobile router 102, and related systems and methods described herein.

Also included in the client aircraft 202 are an intra-client aircraft network 212, a plurality of sensors 214 and 216, and a plurality of computing devices 218, and 220. Sensors 214 and 216 can include a temperature sensor, pressure sensor, accelerometer, or any other device configured for sensing an aspect of an environment of the client aircraft 202 or an operational status of the client aircraft 202. Computing devices 218 and 220 can include an aileron controller, elevator controller, or any other computing device configured to control or measure an operational aspect of the client aircraft 202. In some instances, computing devices 218 and 220 can themselves include one or more sensors.

Because the client aircraft 202 contains the intra-client aircraft network 212, the mobile router 102 can serve as a gateway for the client aircraft 202 that performs IoT functionality. The mobile router 102 might receive a query an authorized node in the ground service network 110, such as fixed router 112, directed to the sensor 214. In an example, the sensor 214 can be a Global Positioning System (GPS) and an air traffic controller node on the ground may query the mobile router 102 for the position of the client aircraft 202. In response to receiving the query, the mobile router 102 may direct communications between the air traffic controller node and the sensor 214. In some instances, the query might be for a particular type of sensor data or a particular parameter, and the mobile router 102 may further determine which sensor/computing device provides that particular type of sensor data or parameter. In other examples, an authorized node in the ground service network 110 might query an address of the specific sensor/computing device.

As another example, the client aircraft 202 might experience a failure state associated with a given sensor/computing device. For example, the client aircraft 202 may unexpectedly begin losing altitude, and determine the failure state based on losing altitude. For example, a client aircraft controller of the client aircraft 202 may receive altitude data from an altimeter of the client aircraft 202 indicative of the client aircraft losing altitude. In response to detecting the failure state, the client aircraft controller causes the mobile router 102 to initiate communications with a ground node in the ground service network 110. Based on the determined failure state, the ground node may query for sensor data from the sensor 214, and the sensor 216, which in the present example may provide sensor data for left and right engines of the client aircraft 202. Querying for relevant sensor data in this fashion may allow for more effective ground support in the event of a failure state in the client aircraft 202, or even permit preemptive monitoring of particular sensors or computing devices. For example, if a sensor has recently been replaced, a ground node may periodically monitor the sensor data for comparison with expected sensor data to determine that the replaced sensor is operating normally. Thus, within examples, the mobile router 102 can also serve as a gateway that connects ground nodes in ground service network 110, such as the fixed router 112, with sensors and computing devices within the client aircraft 202.

Figure 3:
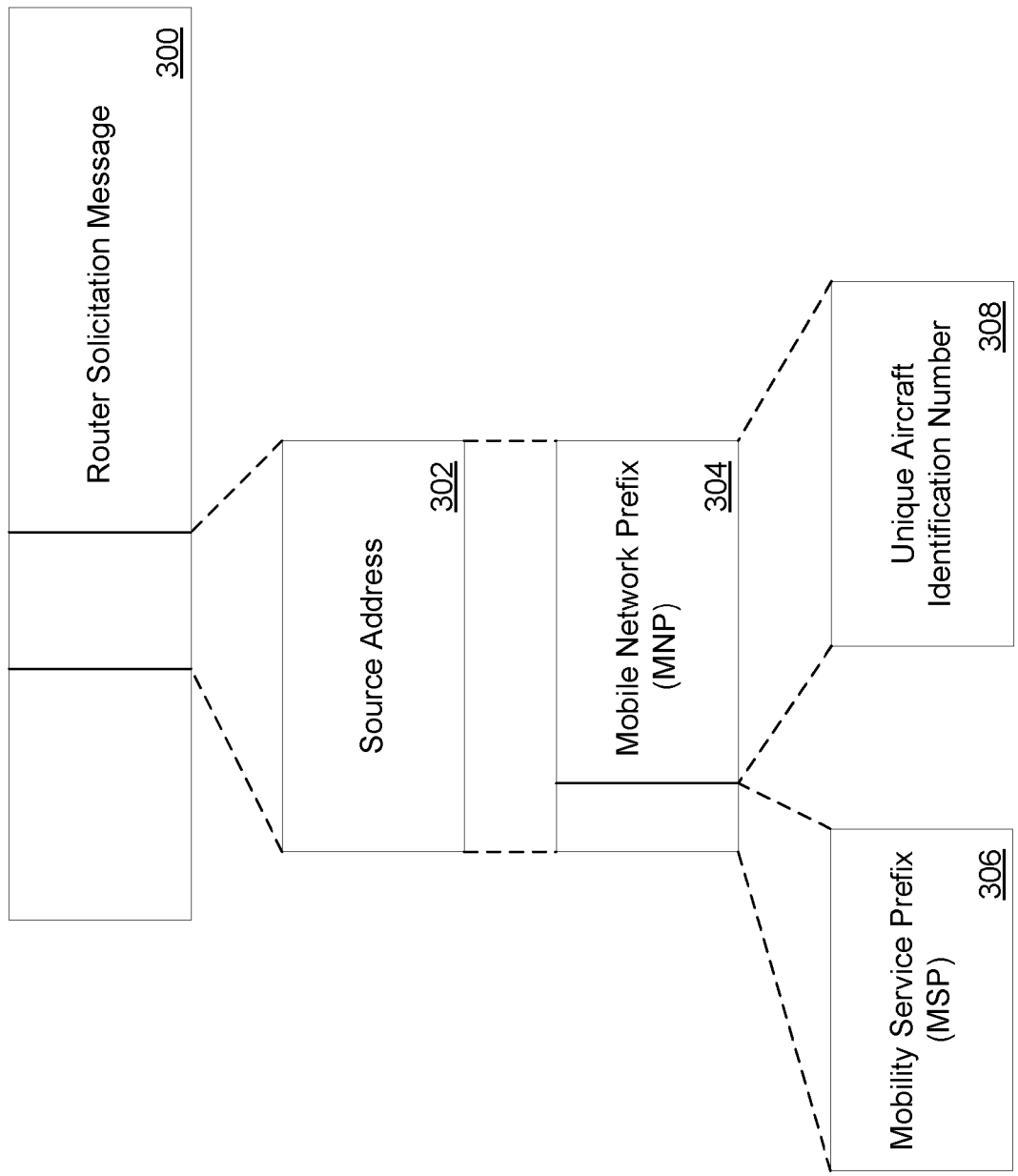
FIG. 3 illustrates a simplified block diagram of a router solicitation message, according to an example embodiment.

FIG. 3 illustrates a simplified block diagram of a router solicitation message 300, according to an example embodiment. As noted above, a mobile router 102 of a client aircraft 202 depicted in FIG. 2 generates a router solicitation message 300. The router solicitation message 300 is used to solicit a router advertisement message from a fixed router in the ground service network 110. The router solicitation message 300 can be structured in accordance with a number of different communication protocols. For instance, the router solicitation message 300 may be configured in accordance with Internet Protocol version 6 (IPv6), or any other similar communication protocol. In such communication schemes, particular bits of a message are pre-assigned to particular data types. In the illustrated example, a section of router solicitation message 300 is pre-assigned to a source address 302.

In order to configure communications with nodes in the ground service network 110, the mobile router embeds an MNP 304 into the source address 302 that is uniquely associated with a given client aircraft. For example, the mobile router 102 associated with a client aircraft might be pre-provisioned with a unique aircraft identification number. Further, each node in a relevant network might know each unique aircraft identification number, and can extract and corroborate the unique aircraft identification number to determine that the client aircraft has permission to communicate over the ground service network.

Within examples, the MNP 304 is formed by combining (i) a Mobility Service Prefix (MSP) 306 associated with the ground service network 110, and (ii) the unique aircraft identification number 308 associated with the client aircraft. The MSP 306 may include an identifier that designates the mobile router 102 as a node that is configured to communicate with nodes in the ground service network 110. The MSP 306 and the unique aircraft identification number 308 can be a pre-provisioned number of bits in accordance with the communication protocol. For example, the MSP 306 might be 32 bits and the unique aircraft identification number 308 can be 24 bits. Combining the MSP 306 and the unique aircraft identification number 308 can include concatenating the MSP 306 and the unique aircraft identification number 308 to form a Mobile Network Prefix (MNP) 304, for example, 56 bits in length.

The fixed router 112 may use PD to delegate the MNP 304 within the ground service network 110, and one or more nodes of the ground service network 110 may corroborate the unique aircraft identification number 308 as part of a registration procedure for the mobile router 102. The fixed router, or one or more ground nodes in the ground service network, uses the source address 302 in the router solicitation message 300 to register the mobile router 102 of the aircraft 202 as the authentic owner of the MNP 304. For example, registering the mobile router 102 may include updating a record corresponding to the mobile router 102 to indicate that it has permission to communicate over the ground service network 300. Following registration, Internet of Things (IoT) devices in the aircraft can communicate with nodes in the ground service network 110.

Figure 4:
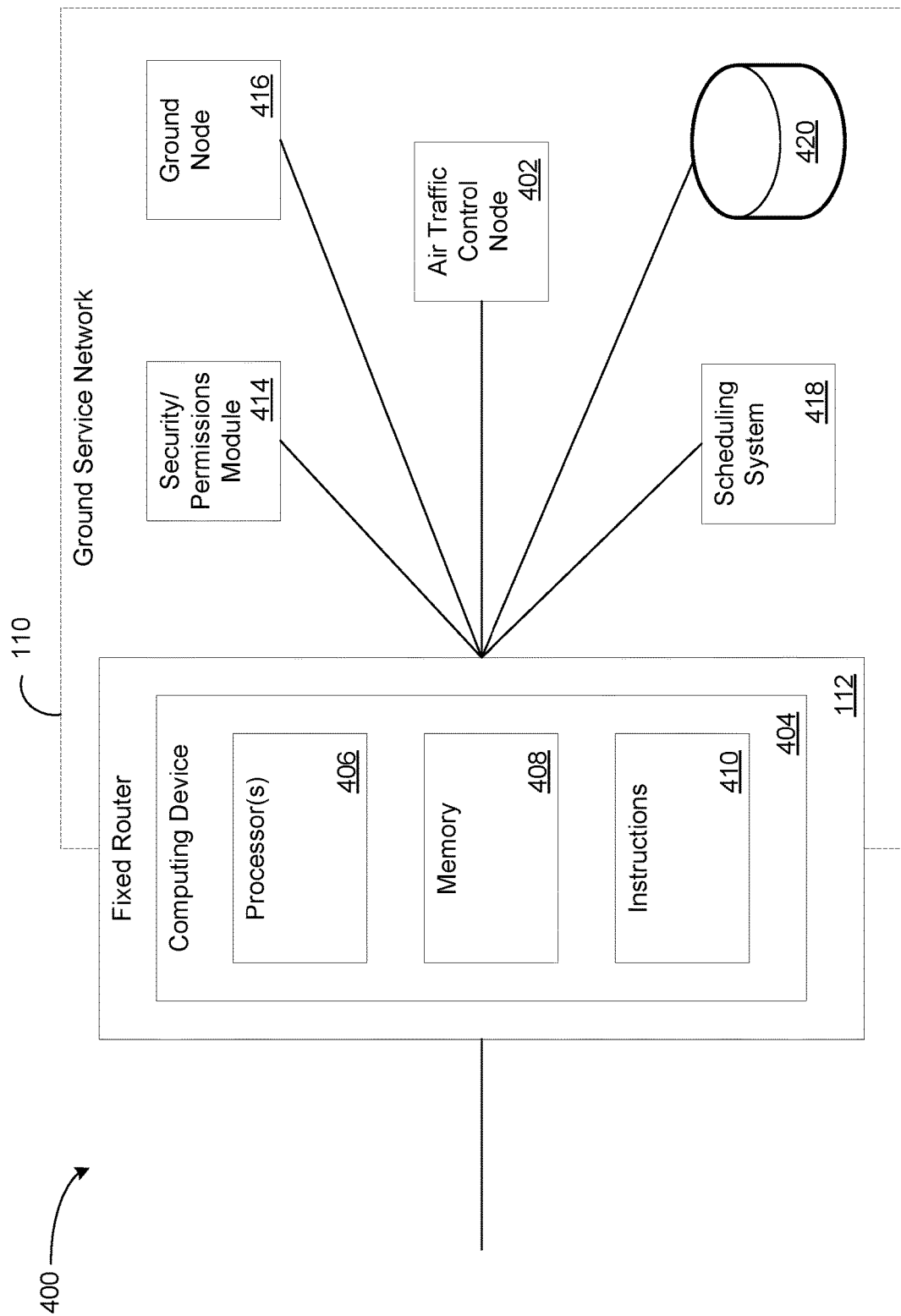
FIG. 4 illustrates a block diagram of another example system including a fixed router in a ground service network, according to an example implementation.

FIG. 4 illustrates a block diagram of another example system 400 including the fixed router 112 of the ground service network 110, according to an example implementation. In the illustrated example, the fixed router 112 can serve as a gateway to an air traffic control node 402, and so may convey communications between the mobile router 102 and the air traffic control node 402, and so may serve as a gateway of the ground service network 110.

Within examples, the fixed router 112 includes a computing device 404 having processor(s) 406, a memory 408, and instructions 410. The memory 408 may be configured similarly to the memory 208 described above with respect to FIG. 2.

The one or more processor(s) 406 may be general-purpose processors or special purpose processors (e.g., digital signal processors, application specific integrated circuits, etc.). The processor(s) 406 may receive communications from fixed routers in the ground service network 110, process the communications, and send responsive communications. The one or more processor(s) 206 can be configured to execute the instructions 410 (e.g., computer-readable program instructions) that are stored in the memory 408 and are executable to provide the functionality of the fixed router 112, and related systems and methods described herein.

The air traffic controller node 402 may be a node within, or connected to, the ground service network 110 and may correspond to an air traffic controller associated with an airport. Fixed router 112 communicates with air traffic control node 402, a security/permissions module 414, a ground node 416, a scheduling system 418, and a database 420. Within examples, the fixed router 112 receives a router solicitation message 300 from the mobile router 102. The fixed router 112 extracts an MNP 304 from the source address 302 of the router solicitation message 300. Based on the MNP 304, the fixed router 112 determines that the mobile router 102 is configured for communicating with the air traffic control node 402, other fixed routers in the ground service network 110, or other ground nodes in the ground service network 110. Further, the fixed router 112 may use PD to delegate the MNP 304 in the ground service network 110, determine the unique aircraft identification number 308 from the MNP 304, and corroborate the unique aircraft identification number 308 to determine that a client aircraft associated with the router solicitation message 300 has permission to communicate over the ground service network 110.

Using PD to delegate the MNP 304 facilitates providing the mobile router 102 with access to the ground service network 110. For example, the fixed router 112 may provide a representation of the MNP 304 in a routing system of the ground service network 110 so that other nodes in the ground service network 110 recognize the MNP 304 in subsequent messages from the mobile router 102.

Corroborating the unique aircraft identification number may include querying the security/permissions module 414 to determine that the unique aircraft identification number corresponds to a client aircraft that has security clearance to communicate over the ground service network 110. The security/permissions module 414 can be a server, database, or another computing device configured for determining which nodes have permission to communicate over ground service network 110. In some examples, the security/permissions module 414 may be associated with a particular airport. Receiving an indication from the security/permissions module 414 that the corresponding client aircraft has permission to communicate over the ground service network 110 may cause the fixed router 112 to responsively send a router advertisement message. The router advertisement message may include configuration information for subsequent communications between the corresponding client aircraft and the fixed router 112. For instance, the router advertisement message may set lifetimes or a schedule as guidance for when subsequent router solicitation messages will be necessary to maintain the communication state between the mobile router and the fixed router 112. Receiving a router advertisement message from the fixed router 112 may indicate to the mobile router that it has permission to communicate over the ground service network 110.

The fixed router 112 may further place a priority level on communications with the client aircraft. For instance, the fixed router 112 may communicate with the scheduling system 418 to determine a status of the client aircraft that corresponds to the unique aircraft identification number. The scheduling system 418 may be a server, database, or another computing device configured for storing flight arrival and departure schedules associated with an airport or multiple airports. In some examples, the scheduling system 418 may further include schedules and protocols for communicating with the ground service network. A client aircraft that is scheduled to land at an airport associated with the air traffic control node 402 within a threshold period (e.g. 30 minutes) might be high priority, whereas a client aircraft that is idling or delayed might be low priority. The fixed router 112 may provide configuration information that corresponds to the priority level assigned to the client aircraft. For example, a lifetime for maintaining a communication status with a high priority client aircraft might be longer than a lifetime for maintaining a communication status with a low priority client aircraft. These lifetimes may be pre-set and known by both the mobile router and the fixed router 112, such that the client aircraft can infer its priority level based on the configuration information and communicate accordingly.

The fixed router 112, may also receive a query from the ground node 416 in the ground service network 110 that relates to a given client aircraft. The query may relate to a particular sensor or computing device in a particular client aircraft, and may include a source address of the sensor or computing device or may include one or more types of desired sensor data or parameters. In turn, the fixed router 112 fixed router 112 can forward the query to the mobile router 102, and can forward a reply from the mobile router 102 to the ground node 416 over the ground service network 110.

In further examples, the fixed router 112, having established that the mobile router has permission to communicate over ground service network 110, may forward sensor data or parameter values from the client aircraft to the ground node 416 in response to receiving the query. In turn, the ground node 416 may retrieve expected data or parameter values for the queried sensor or computing device in the client aircraft, compare the received values to the expected values, and determine whether the corresponding sensor or computing device is performing normally based on comparing the values. For example, the ground node 416 may determine that a given sensor or computing device, or a feature of a client aircraft associated with the given sensor or computing device, is performing normally based on the received values being within a threshold percentage (e.g. 10%). The ground node 416 may provide a status update or control instruction to the fixed router 112 for forwarding to the mobile router based on whether the sensor or computing device is determined to perform normally. For example, if the sensor or computing device is determined as not performing normally, the ground node 416 may instruct the client aircraft to rely on a redundant sensor or computing device rather than the queried sensor or computing device.

Figure 5:
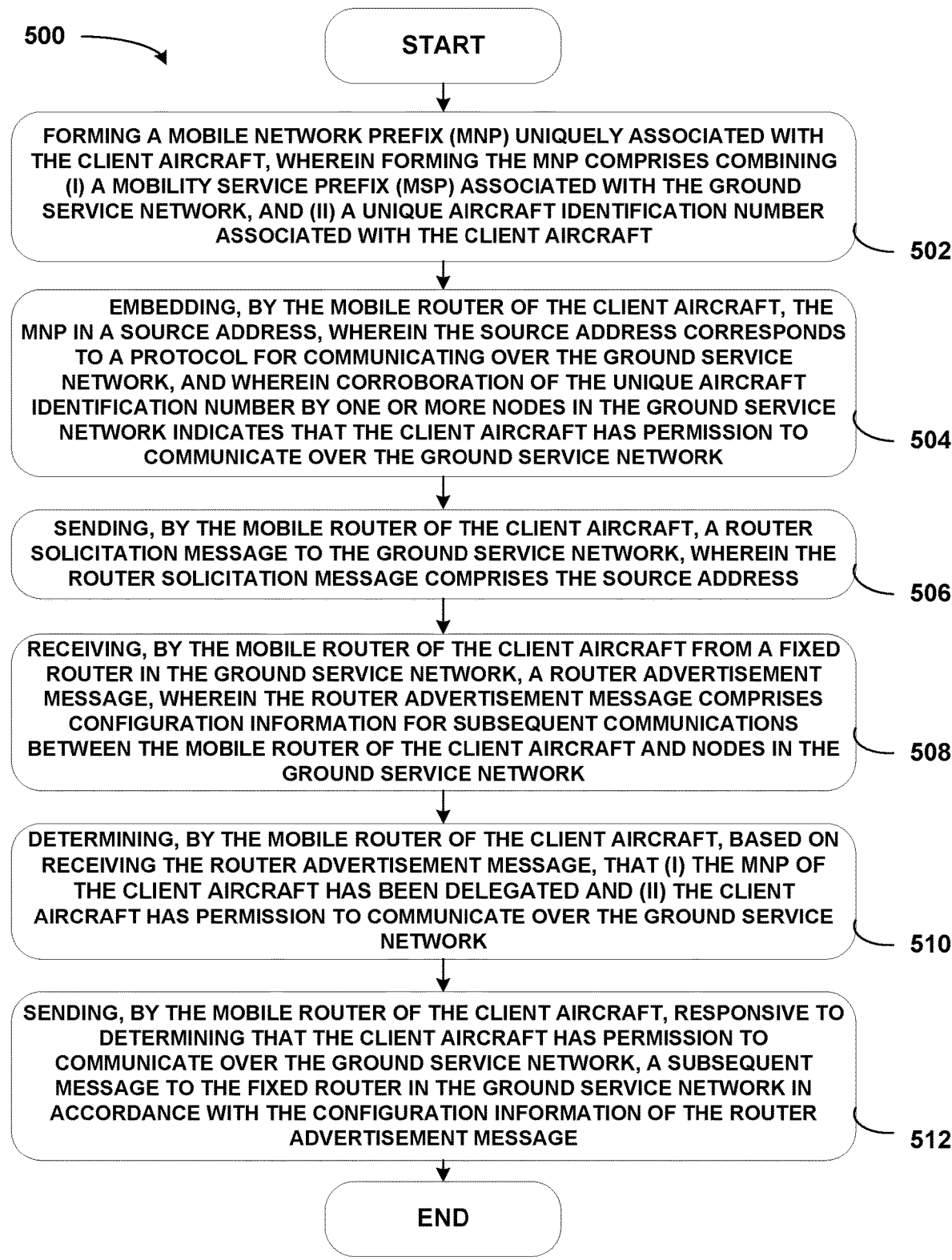
FIG. 5 illustrates a flowchart of an example method for automatically configuring communications between a client aircraft and the ground service network, according to an example implementation.

FIG. 5 shows a flowchart of a method 500 for automatically configuring communications between the client aircraft 202 and a node in the ground service network 110, according to an example implementation. The method 500 shown in FIG. 5 presents an example of a method that could be used with the mobile router 102 shown in FIGS. 1 and 2, with components of the mobile router 102, or in conjunction with a client aircraft, such as the client aircraft 202 shown in FIG. 2, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. The method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 5, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes forming a Mobile Network Prefix (MNP) 304 that is uniquely associated with a client aircraft 202. Within examples, forming the MNP 304 includes combining (i) a Mobility Service Prefix (MSP) associated with the ground service network 110, and (ii) a unique aircraft identification number 308 associated with the client aircraft 202. The MSP, for example, may include an identifier that designates the mobile router 102 as being configured for communicating with ground nodes in the ground service network 110. The ground nodes in the ground service network 110 can be, for example, fixed routers configured for air-to-ground communications in accordance with a protocol. In examples, the MSP 306 is concatenated with the unique aircraft identification number 308 to form the MNP 304. Further, in some examples the MNP can be automatically generated by the mobile router 102, and in other examples, the MNP can be pre-assigned by a service provider, such as a mobile network that serves the client aircraft 202.

At block 504, the method 500 includes embedding, by the mobile router 102 of the client aircraft 202, the MNP 304 in a source address 302, wherein the source address 302 corresponds to a protocol for communicating over the ground service network 110. In such examples, the protocol for communicating over the ground service network 110 can be IPv6, and the unique aircraft identification number 308 associated with the client aircraft 202 includes a predetermined number of bits. For example, the unique aircraft identification number 308 might be 24 bits. Embedding the MNP can involve combining the MNP 304 with additional information, modulating the MNP 304, or otherwise altering the MNP 304 prior to sending a router solicitation message 300. In other examples, embedding the MNP 304 into the source address 302 may simply involve sending the MNP 304 in accordance with a protocol for communicating the source address within a router solicitation message 300. The router solicitation message 300 may include additional information, such as a communication type identifier and a checksum value. The unique aircraft identification number 308 might be generally known by nodes in the ground service network 110, so corroboration of the unique aircraft identification number 308 by one or more additional nodes in the ground service network 110 indicates that the client aircraft 202 has permission to communicate over the ground service network 110.

At block 506, the method 500 includes sending, by the mobile router 102 of client aircraft 202, a router solicitation message 300 to a fixed router 112 in the ground service network 110, wherein the router solicitation message 300 includes the source address 302. The fixed router 112 may correspond to a ground service network 110 associated with an airport, such as a destination airport of the client aircraft 202.

At block 508, the method 500 includes receiving, by the mobile router 102 the client aircraft 202 from the fixed router 112 in the ground service network 110, a router advertisement message. The router advertisement message includes configuration information for subsequent communications between the mobile router 102 of the client aircraft 202 and fixed routers in the ground service network 110. For example, the configuration information can include a router lifetime value that indicates the usefulness of a router, such as the fixed router 112, as the default router for communications over the ground service network 110. The configuration information may also include a time interval between solicitation message retransmissions from the mobile router 102. These values, in addition to configuring subsequent communications, might provide context for the mobile router 102. For example, as described above, the mobile router 102 may infer that it has high or low priority for communicating over the ground service network 110 based on the configuration information.

At block 510, the method 500 includes determining, by the mobile router 102 of the client aircraft 202, based on receiving the router advertisement message, that the MNP 304 of the client aircraft 202 has been delegated and that the client aircraft 202 has permission to communicate over the ground service network 110. The mobile router 102 can infer this because the fixed router 112 sends a router advertisement message in response to corroborating the MNP 304 that is uniquely associated with a client aircraft 202.

At block 512, the method 500 includes sending, by the mobile router 102 of the client aircraft 202, responsive to determining that the client aircraft 202 has permission to communicate over the ground service network 110, a subsequent message to the fixed router 112 in the ground service network 110 in accordance with the configuration information of the router advertisement message. For example, the mobile router 102 may send the subsequent message prior to expiration of a time interval specified in the router advertisement message. In this fashion, communications between the mobile router 102 and the fixed router 112 are automatically configured using only a single exchange of messages.

Figure 6:
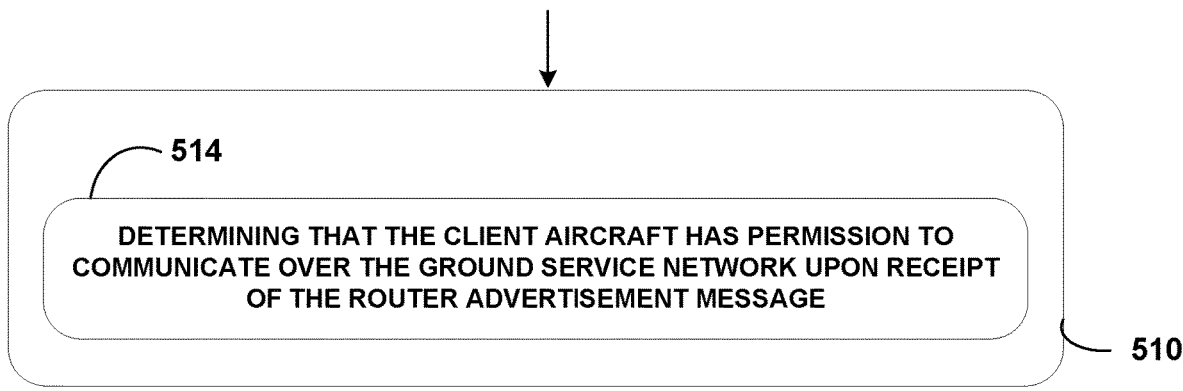
FIG. 6 shows a flowchart of another example method for use with the method shown in FIG. 5, according to an example implementation.

FIG. 6 shows a flowchart of another example method for use with the method shown in FIG. 5, according to an example implementation. Block 514 is performed in accordance with block 510. At block 514, functions include determining that the client aircraft 202 has permission to communicate over the ground service network 110 upon receipt of the router advertisement message. In this fashion, the mobile router 102 may quickly determine that it has permission to communicate over the ground service network 110.

Figure 7:
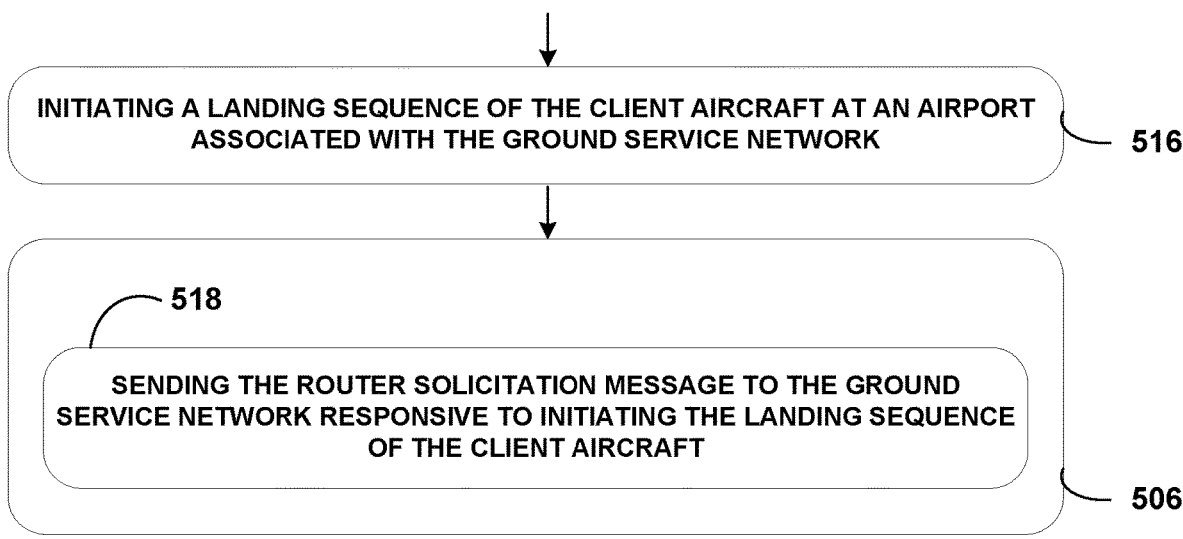
FIG. 7 shows a flowchart of another example method for use with the method shown in FIG. 5, according to an example implementation.

FIG. 7 shows a flowchart of another example method for use with the method shown in FIG. 5, according to an example implementation. In particular, FIG. 7 corresponds to an embodiment wherein the fixed router 112 provides a gateway for communications between the client aircraft and the ground service network 110. At block 516, functions include initiating a landing sequence of the client aircraft 202 at an airport associated with the ground service network 110. For example, the ground service network 110 may serve a plurality of fixed routers and nodes in, or associated with, an airport. Block 518 is performed in accordance with block 506. At block 518, functions include sending the router solicitation message 300 to the fixed router 112 of the ground service network 110 responsive to initiating the landing sequence of the client aircraft 202. Thus, FIG. 7 shows an example of initiating configuration of communications based on a context of the client aircraft 202, which may allow for further reductions in communications between the client aircraft 202 and the ground service network 110 via the fixed router 112.

Figure 8:
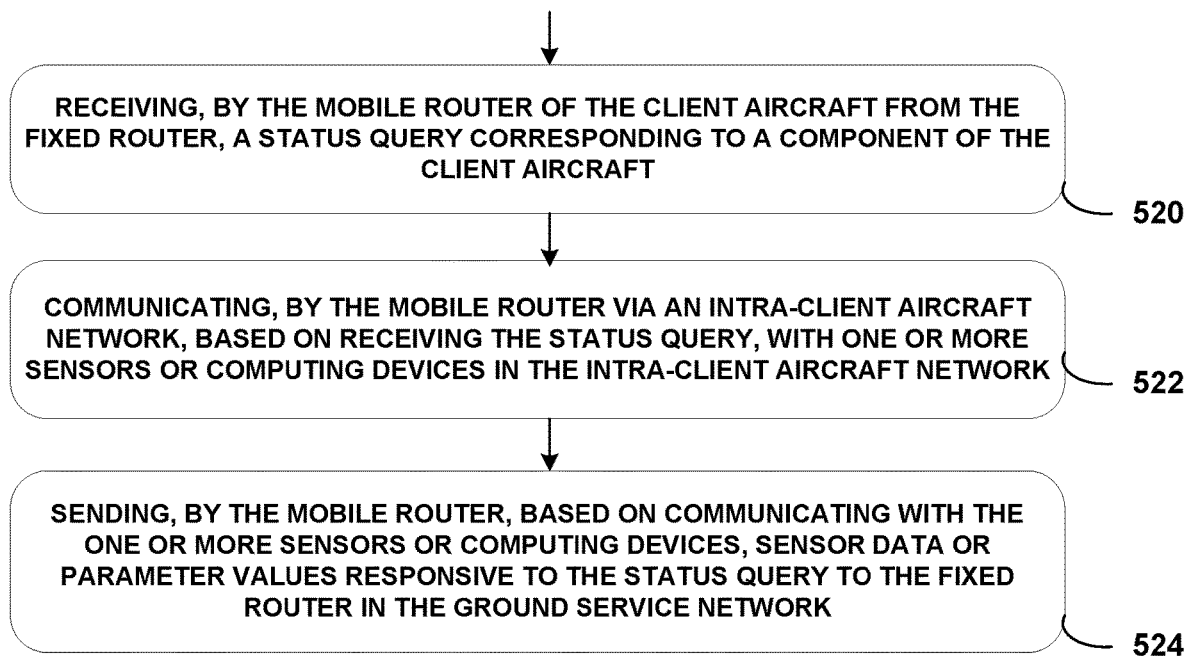
FIG. 8 shows a flowchart of another example method for use with the method shown in FIG. 5, according to an example implementation.

FIG. 8 shows a flowchart of another example method for use with the method shown in FIG. 5, according to an example implementation. At block 520, functions include receiving, by the mobile router 102 of the client aircraft 202 from the fixed router 112, a status query corresponding to a component of the client aircraft 202. The component may include a GPS, inertial measurement unit (IMU), gyroscopic sensor, aileron and elevator controller, or any other sensor or computing device in the client aircraft 202. For example, a component of the client aircraft 202 may include any of the sensors 214 and 216, or computing devices 218, and 220 described above with respect to FIG. 2. At block 522, functions include communicating, by the mobile router 102 via an intra-client aircraft network 212, based on receiving the status query, with the sensors 214 and 216, or computing devices 218, and 220 in the intra-client aircraft network 212. In some examples, the query may specify a desired data type or a parameter from a ground node in the ground service network 110. The mobile router 102 may communicate with one or more sensors and/or computing devices associated with the desired data type or parameter. In other examples, the query may specify an address of a particular sensor or computing device, and mobile router 102 may communicate with the particular sensor or computing device. At block 524, functions include sending, by the mobile router 102, based on communicating with the one or more sensors and/or computing devices, sensor data and/or parameter values responsive to the status query to the fixed router 112 in the ground service network 110. Thus, within examples, the mobile router 102 may serve as a gateway node between sensors and/or computing devices in the client aircraft 202 and ground nodes in the ground service network 110. In such examples, the mobile router 102 may communicate with the sensors and/or computing devices in accordance with the protocol for communicating over the ground service network. For example, the mobile router 102 may communicate with any of the sensors 214 and 216, or computing devices 218, and 220 in accordance with the IPv6 protocols.

Figure 9:
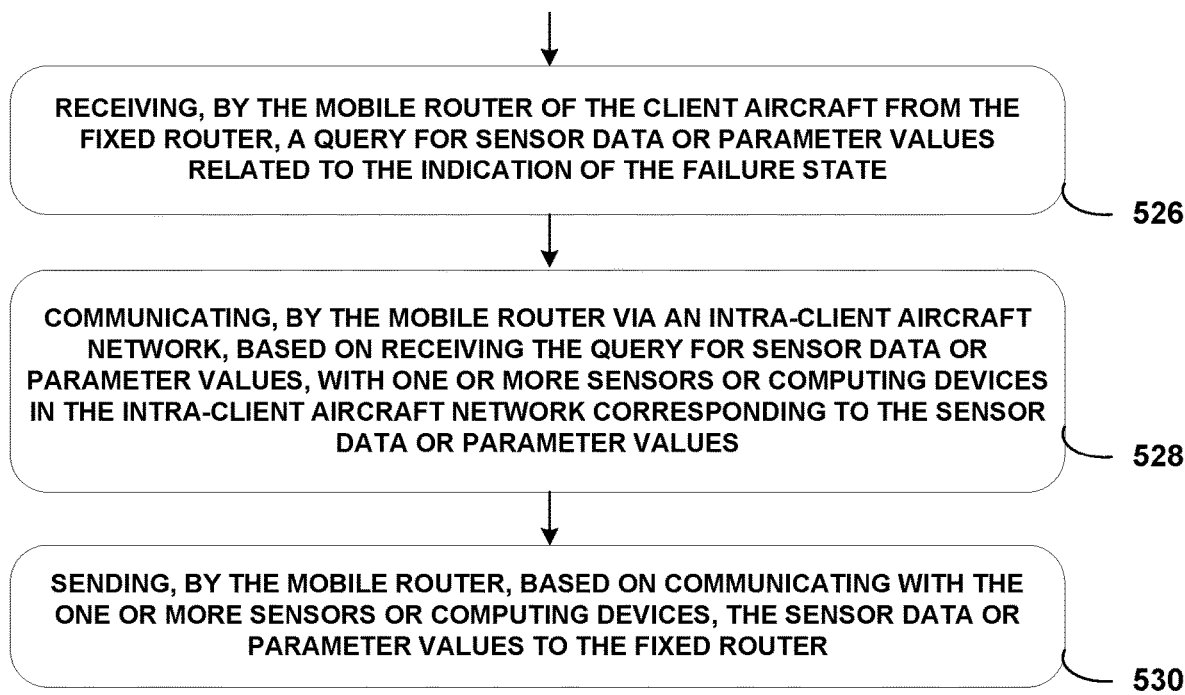
FIG. 9 shows a flowchart of another example method for use with the method shown in FIG. 5, according to an example implementation.

FIG. 9 shows a flowchart of another example method for use with the method shown in FIG. 5, according to an example implementation. In particular, FIG. 9 corresponds to an embodiment wherein the subsequent message comprises an indication of a failure state of a component of the client aircraft 202. For example, the mobile router 102 or another computing device in the client aircraft 202 may detect that a component, such as a sensor, controller, actuator, or the like of the client aircraft 202 has failed. Detecting that the component has failed may include comparing data or parameter values from the component to expected data or parameter values, and determining that the actual data or parameters differ from the expected data or parameter values by a threshold amount (e.g. 10%). The mobile router 102 may responsively send an indication of the detected failure state to the fixed router 112. At block 526, functions include receiving, by the mobile router 102 of the client aircraft 202 from the fixed router 112, a query for sensor data or parameter values related to the indication of the failure state. At block 528, functions include communicating, by the mobile router 102 via the intra-client aircraft network 212, based on receiving the query for sensor data and/or parameter values, with one or more sensors and/or computing devices in the intra-client aircraft network 212 corresponding to the sensor data and/or parameter values. At block 530, functions include sending, by the mobile router 102, based on communicating with the one or more sensors and/or computing devices, the sensor data and/or parameter values to the fixed router 112. Sending relevant data and/or parameter values to the fixed router 112 in response to a detected failure state may allow for nodes in the ground service network 110 to corroborate the failure state, determine solutions to the failure state, or to provide instructions to the mobile router 102.

Figure 10:
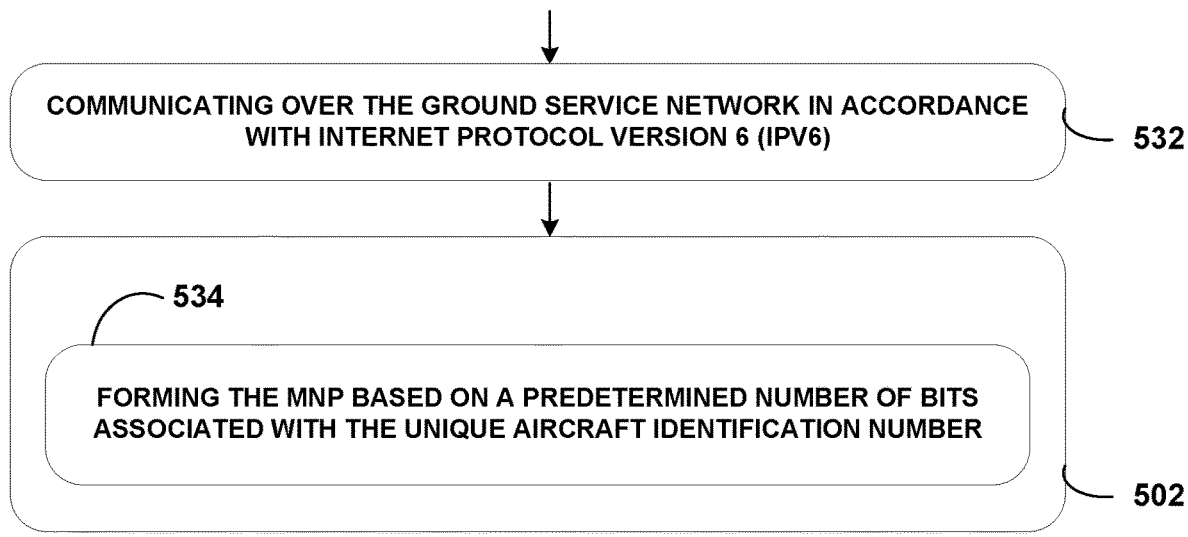
FIG. 10 shows a flowchart of another example method for use with the method shown in FIG. 5, according to an example implementation.

FIG. 10 shows a flowchart of another example method for use with the method shown in FIG. 5, according to an example implementation. At block 532, functions include communicating over the ground service network 110 in accordance with Internet Protocol version 6 (IPv6). Block 534 is performed in accordance with block 502. At block 534, functions include forming the MNP 304 based on a predetermined number of bits associated with the unique aircraft identification number 308. For examples, the unique aircraft identification number 308 might have 24 bits, and the mobile router 102 might form the MNP 304 based on the unique aircraft identification number 308 having 24 bits.

Figure 11:
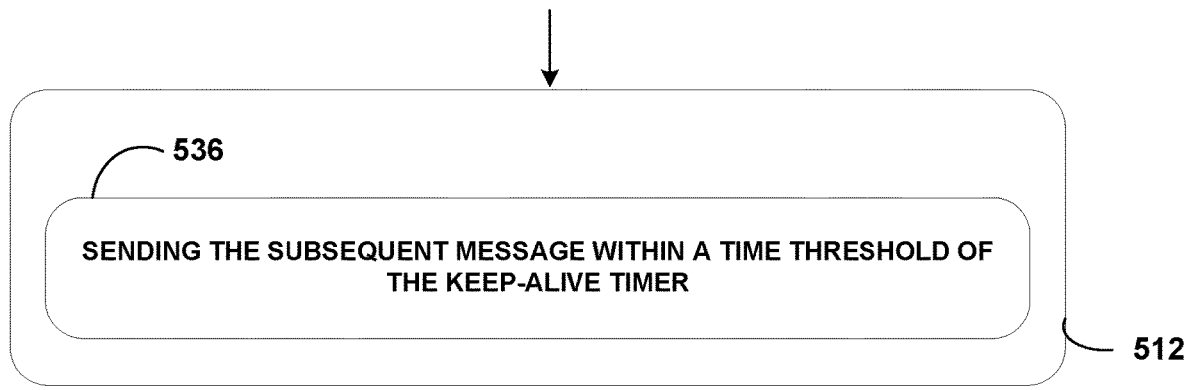
FIG. 11 shows a flowchart of another example method for use with the method shown in FIG. 5, according to an example implementation.

FIG. 11 shows a flowchart of another example method for use with the method shown in FIG. 5, according to an example implementation. In particular, FIG. 11 corresponds to an embodiment wherein the configuration information for subsequent communication between the mobile router 102 of the client aircraft 202 and the fixed router 112 includes a keep-alive timer for maintaining a communication state between the mobile router 102 of the client aircraft 202 and the fixed router 112. The keep-alive timer may include a threshold time (e.g. 60 seconds) during which the communication state may remain "active" without further communication between the mobile router 102 and the fixed router 112. The communication state might be "active" where the fixed router 112 is expecting subsequent messages from the mobile router 102, or "inactive" where the fixed router 112 is not expecting subsequent messages from the mobile router 102. For instance, after expiration of the keep-alive timer, the mobile router 102 may send a second router solicitation message to reconfigure communications with the fixed router 112. Block 536 is performed in accordance with block 512. At block 536, functions include sending the subsequent message to the fixed router comprises sending the subsequent message within a time threshold of the keep-alive timer.

Figure 12:
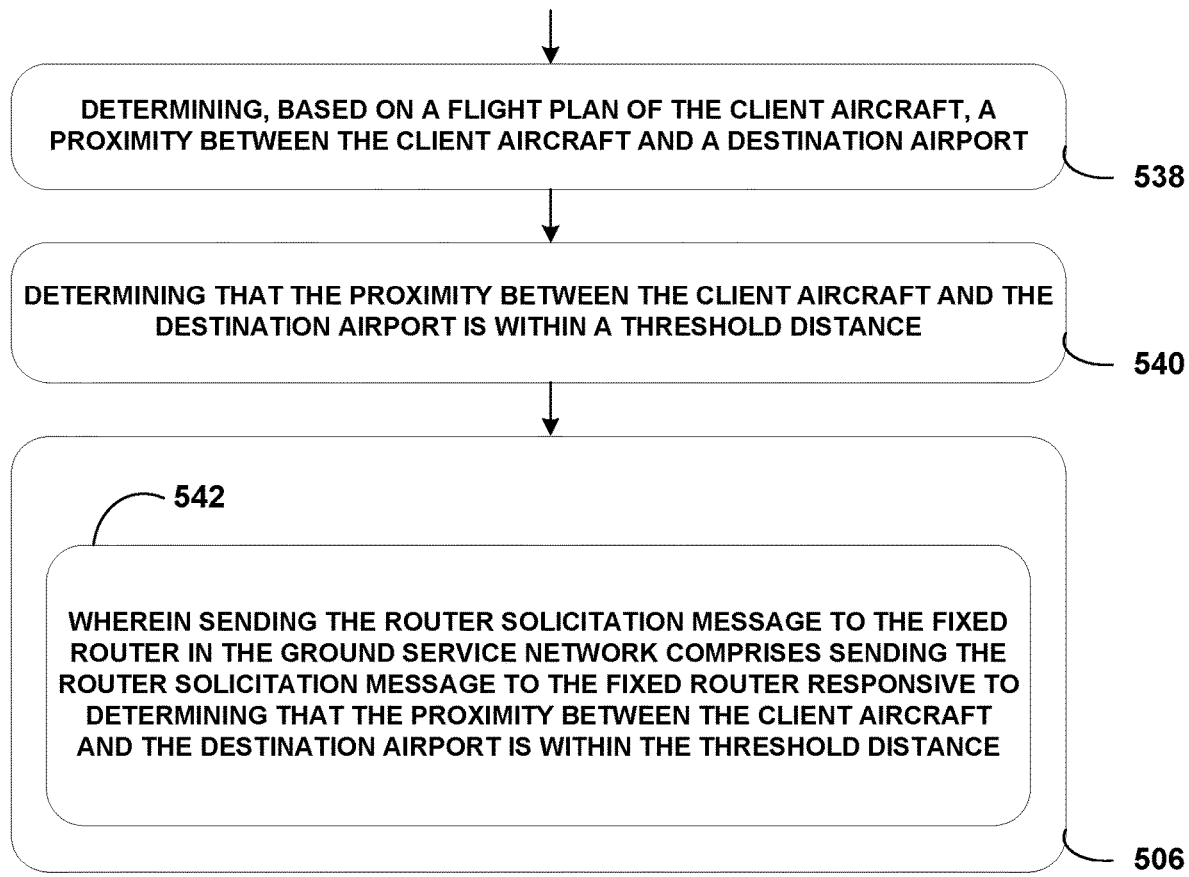
FIG. 12 shows a flowchart of another example method for use with the method shown in FIG. 5, according to an example implementation.

FIG. 12 shows a flowchart of another example method for use with the method shown in FIG. 5, according to an example implementation. At block 538, functions include determining, based on a flight plan of the client aircraft 202, a proximity between the client aircraft 202 and a destination airport. For example, the flight plan may include expected locations of the client aircraft 202. A computing device associated with client aircraft 202, such as mobile router 102, may approximate a current location of the client aircraft 202 relative to the destination airport based on a current time. In other examples, the current location of the client aircraft 202 and corresponding proximity to the destination airport may be determined based on GPS data for the client aircraft 202. At block 540, functions include determining that the proximity between the client aircraft 202 and the destination airport is within a threshold distance (e.g. 100 miles). Block 542 is performed in accordance with block 506. At block 542, functions sending the router solicitation message 300 to the fixed router 112 of the ground service network 110 associated with the destination airport responsive to determining that the proximity between the client aircraft 202 and the destination airport is within the threshold distance. Thus, the mobile router 102 may automatically configure communications with the fixed router 112 based on a proximity of the client aircraft 202 to its destination.

Figure 13:
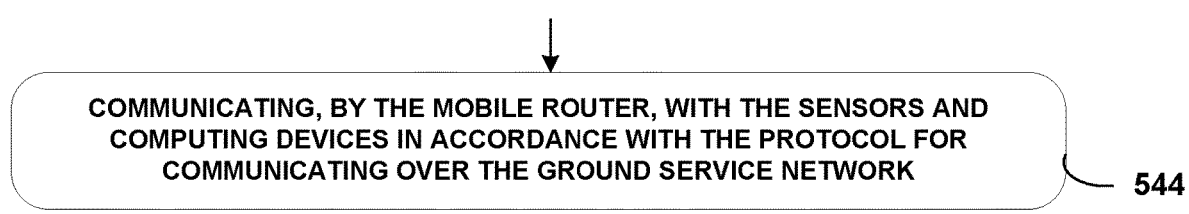
FIG. 13 shows a flowchart of another example method for use with the method shown in FIG. 5, according to an example implementation.

FIG. 13 shows a flowchart of another example method for use with the method shown in FIG. 5, according to an example implementation. In particular, FIG. 13 corresponds to an embodiment wherein the mobile router 102 serves as a gateway node between sensors and computing devices in the client aircraft and ground nodes in the ground service network 110. For example, mobile router 102 may serve as a gateway to sensors 214 and 216, and computing devices 218 and 220. At block 544, functions include communicating, by the mobile router 102, with the sensors and computing devices in accordance with the protocol for communicating over the ground service network. In this manner, any node in ground service network 110 having permission to communicate with mobile router 102 can query for information from a specific sensor or computing device in client aircraft 202.

Figure 14:
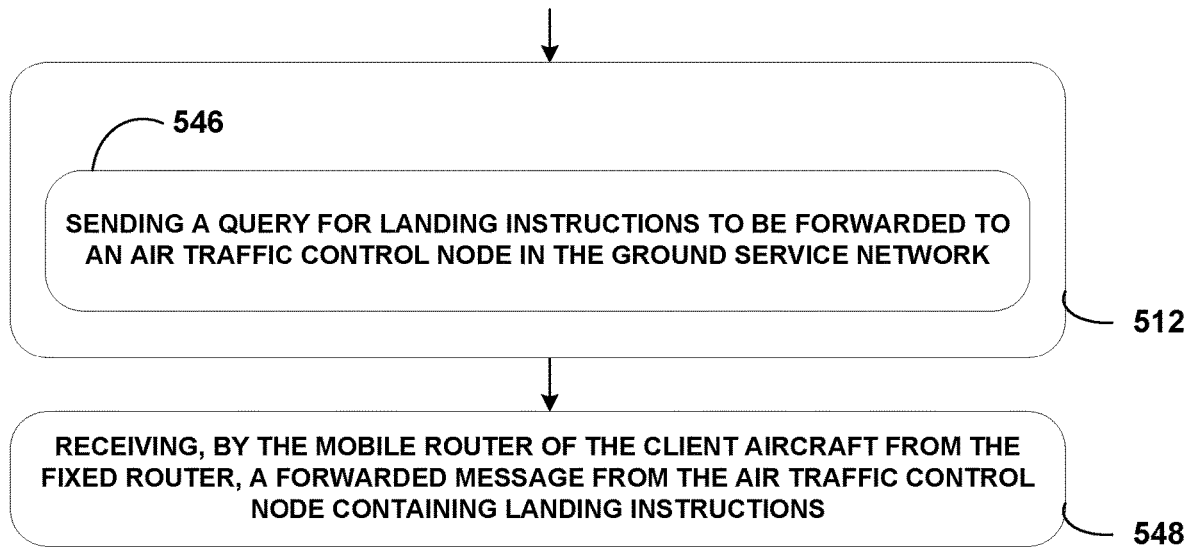
FIG. 14 shows a flowchart of another example method for use with the method shown in FIG. 5, according to an example implementation.

FIG. 14 shows a flowchart of another example method for use with the method shown in FIG. 5, according to an example implementation. Block 546 is performed in accordance with block 512. At block 546, functions include sending a query for landing instructions to be forwarded to an air traffic control node 402 in the ground service network. In turn, the fixed router 112 in the ground service network 110 may forward the query to the air traffic control node 402. At block 548, functions include receiving, by the mobile router 102 of the client aircraft 202 from the fixed router 112, a forwarded message from the air traffic control node 402 containing landing instructions receiving the landing instructions for the airport. In examples, the router solicitation message 300 may serve as a request for landing instructions based on a context of the client aircraft 202. For example, the router solicitation message 300 may serve as a request for landing instructions if a current time is 30 minutes or less from a scheduled landing time for the client aircraft 202.

Figure 15:
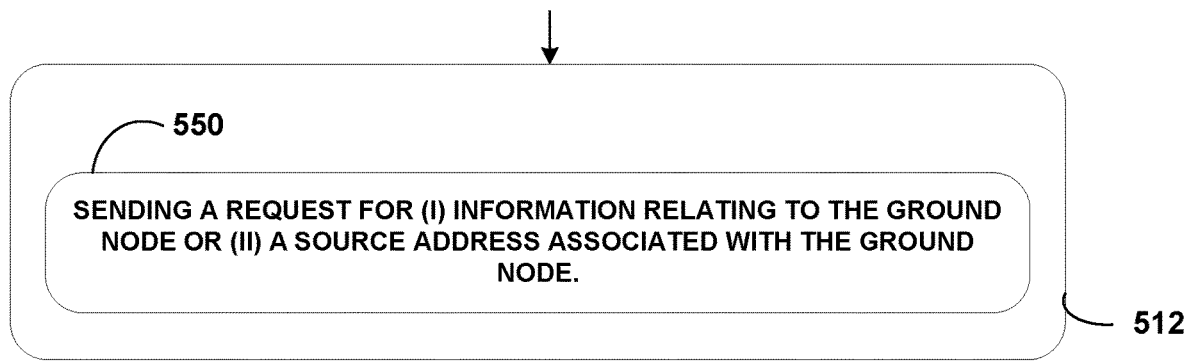
FIG. 15 shows a flowchart of another example method for use with the method shown in FIG. 5, according to an example implementation.

FIG. 15 shows a flowchart of another example method for use with the method shown in FIG. 5, according to an example implementation. In particular, FIG. 15 corresponds to an embodiment wherein the fixed router 112 serves as a gateway for ground nodes in the ground service network 110. Block 550 is performed in accordance with block 512. At block 550, functions include sending a request for (i) information relating to one or more of the ground nodes or (ii) one or more source addresses associated with the one or more of the ground nodes. The ground nodes could include the ground node 416, the scheduling system 418 or the database 420. In an example, the request for information relating to one or more of the ground nodes may include a request for scheduling information from the scheduling system 418, or an address of the scheduling system 418. In this fashion, the client aircraft 202, by way of the mobile router 102, may query ground nodes for relevant information. Further, in such examples, the fixed router 112 may serve as a gateway to ground nodes in the ground service network 110.

Figure 16:
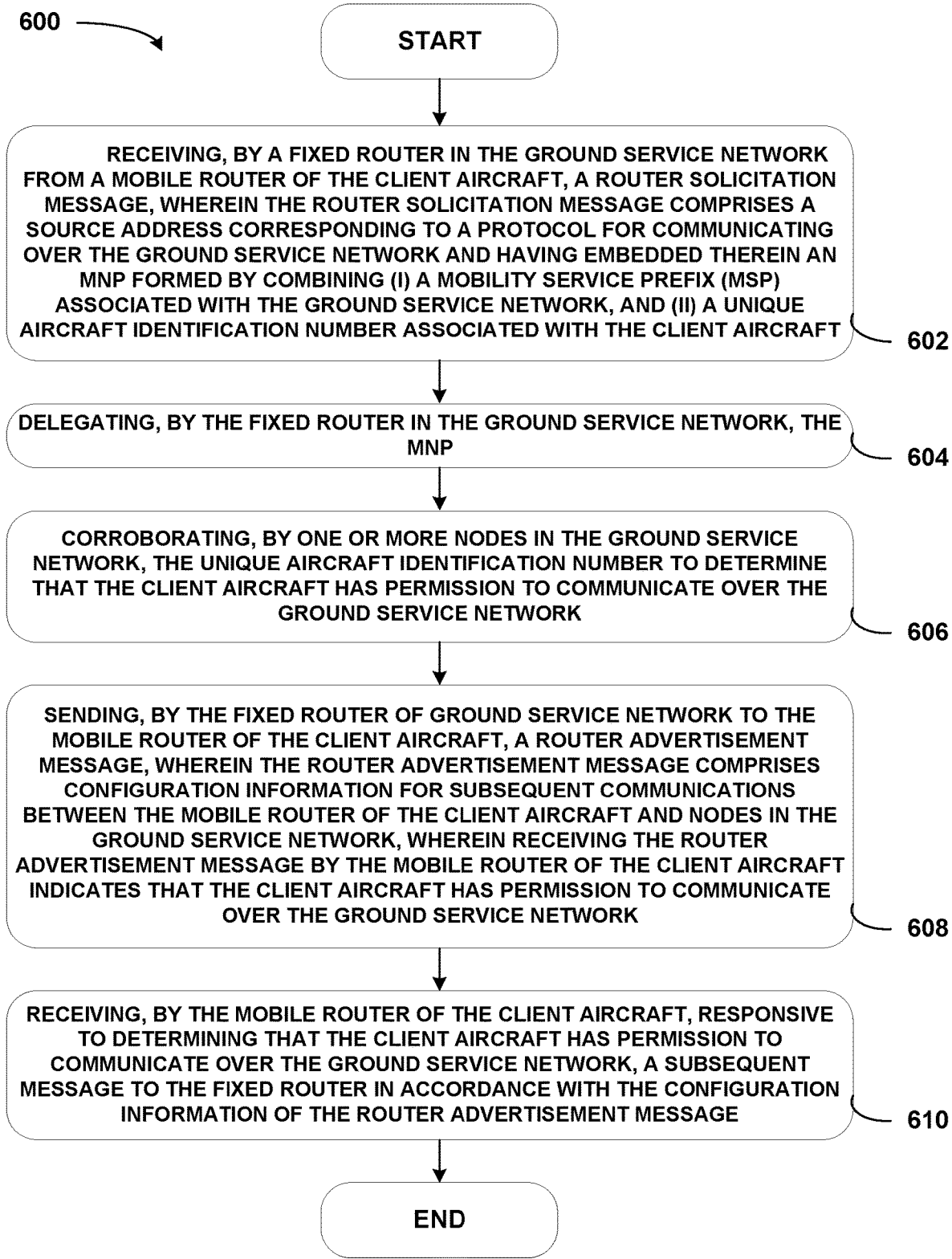
FIG. 16 illustrates a flowchart of an example method for automatically configuring communications between a client aircraft and nodes in a grounds service network, according to an example implementation.

FIG. 16 illustrates a flowchart of an example of another method 600 for automatically configuring communications between a client aircraft and an ground service network in a network, according to an example implementation. The method 600 shown in FIG. 12 presents an example of a method that could be used with the fixed router shown in FIGS. 1 and 4, with components of the fixed router 112, or in conjunction with an air traffic control node, such as the air traffic control node 402 shown in FIG. 4, for example. Further, devices or systems may be used or configured to perform logical functions presented in FIG. 16. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. The method 600 may include one or more operations, functions, or actions as illustrated by one or more of blocks 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 602, the method 600 includes receiving, a fixed router 112 in the ground service network 110 from a mobile router 102 of the client aircraft 202, a router solicitation message 300. As noted above, the fixed router 112 may correspond to the fixed router 112 illustrated in FIGS. 1 and 4. The router solicitation message 300 includes a source address 302 that corresponds to a protocol for communicating over ground service network 110. For example, the source address 302 may correspond to IPv6. The router solicitation message 300 may further include a MNP 304 that is embedded in the source address 302. The MNP 304 may include a Mobility Service Prefix (MSP) 306 that designates a mobile router 102 of the client aircraft as a mobile router configured for communicating with ground nodes in ground service network 110. The MSP 306 may be a known identifier in accordance with the protocol for communicating over ground service network 110 that designates a type of router for the mobile router 102. For example, the MSP may denote that the mobile router 102 is associated with an aircraft and is configured for communicating over ground networks, such as the ground service network 110. The MNP 304 may further include a unique aircraft identification number 308 associated with the client aircraft 202. The fixed router 112 in the ground service network 110 may be configured to receive several router solicitation messages 300 from several different mobile routers, and may schedule communications based on permissions to communicate over the ground service network 110 or to prioritize some mobile routers over others based on context.

At block 604, the method 600 includes delegating, by the fixed router 112 in the ground service network 110, the MNP 304. For example, the fixed router 112 may use PD in accordance with a protocol, such as IPv6, to facilitate network access to the ground service network 110 for the mobile router 102 and to provide a representation of the MNP 304 within the ground service network 110. For example, the fixed router 112 may provide a representation of the MNP 304 within a routing system of the ground service network 110 such that other nodes within the ground service network recognize the MNP 304 upon receiving subsequent messages from the mobile router 102. Delegating the MNP 304 in this manner may be performed as part of a registration procedure for mobile routers attempting to gain access to the ground service network 110.

At block 606, the method 600 includes corroborating, by the fixed router 112 of the ground service network, the unique aircraft identification number 308 to determine that the client aircraft 202 has permission to communicate over the ground service network 110. Determining this may include extracting the MSP 306 and the unique aircraft identification number 308 from the router solicitation message 300 by demodulating the router solicitation message 300 in accordance with the protocol for communicating over the ground service network 110. The ground service network thus may determine the MSP 306, and further determine, based on the MSP 306, that the mobile router 102 is configured for communicating with the ground service network 110. For example, the fixed router 112, or another node the ground service network 110, may compare the MSP 306 with a list of known identifiers, and match the MSP 306 with a corresponding identifier on the list. The ground service network may have further protocols associated with the MSP 306 that allow it to extract the unique aircraft identification number 308. The ground service network may thus determine the unique aircraft identification number 308 from the embedded MNP 304, and corroborate the unique aircraft identification number 308. Corroborating the unique aircraft identification number 308 may similarly include comparing the unique aircraft identification number 308 to a list of known client aircraft identification numbers, and matching the unique aircraft identification number 308 to an identifier on the list, and determining that the matched identifier has a status indicating that it has permission to communicate over the ground service network 110. Corroborating the unique aircraft identification number 308 may also involve determining whether and when the client aircraft 202, associated with the unique aircraft identification number 308, is scheduled to arrive at an airport associated with the ground service network 110. The fixed router 112, or another ground node in the ground service network 110, may responsively determine a priority level associated with the client aircraft 202 for communicating over the ground service network 110.

At block 608, the method 600 includes sending, by the fixed router 112 in the ground service network 110 to the mobile router 102 of the client aircraft 202, a router advertisement message. The router advertisement message includes configuration information for subsequent communications between the mobile router 102 of the client aircraft 202 and the ground service network. For instance, the configuration information may schedule subsequent messages from the mobile router 102. The fixed router 112 may schedule such messages differently based on the priority level associated with the client aircraft 202. Further, receiving the router advertisement message by the mobile router 102 of the client aircraft 202 indicates that the client aircraft 202 has permission to communicate over the ground service network 110.

At block 610, method 600 includes receiving, by the ground service network from the mobile router 102 of the client aircraft 202, a subsequent message in accordance with the configuration information of the router advertisement message. In this fashion, the fixed router 112 may automatically configure communications with the mobile router 102 based on a single exchange of messages, and may further reduce unnecessary communication by scheduling such communications based on context, as described further below.

Figure 17:
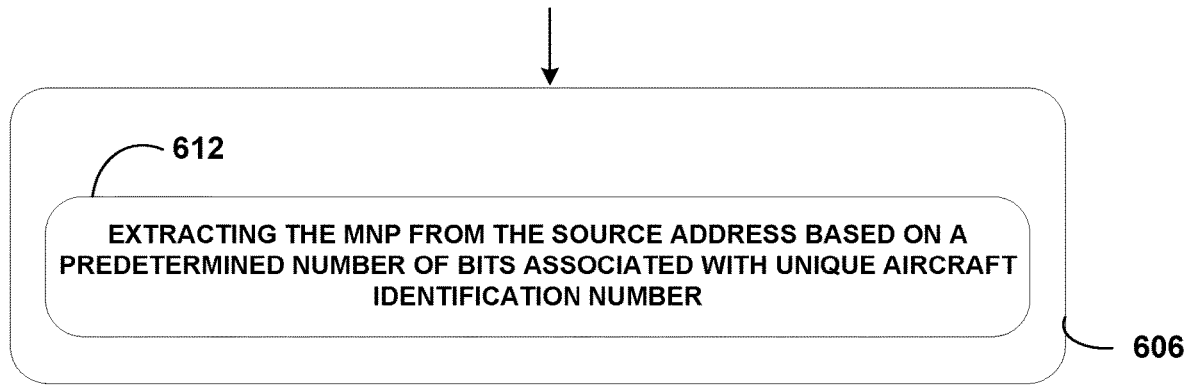
FIG. 17 shows a flowchart of another example method for use with the method shown in FIG. 12, according to an example implementation.

FIG. 17 shows a flowchart of another example method for use with the method shown in FIG. 12, according to an example implementation. Block 612 is performed in accordance with block 606. At block 612, functions include extracting the MNP 304 from the source address 302 based on a predetermined number of bits associated with unique aircraft identification numbers. For example, unique aircraft identification numbers might be predetermined to have 24 bits, and the ground service network might extract the unique aircraft identification number 308 based on it having 24 bits.

Figure 18:
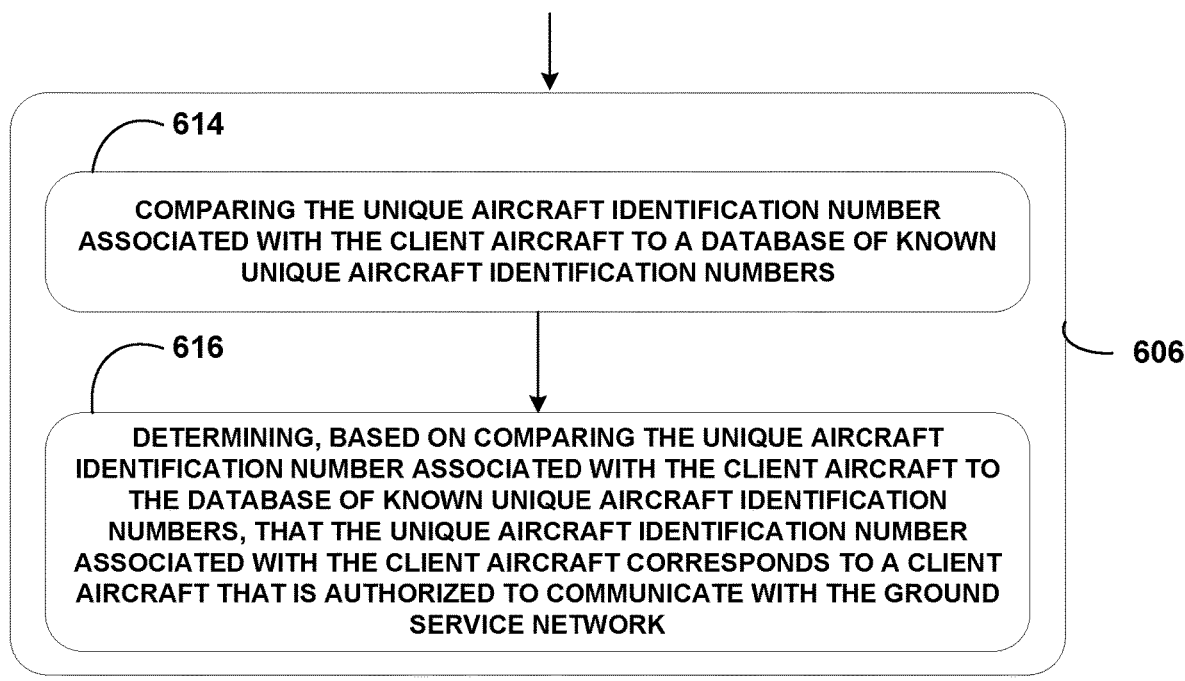
FIG. 18 shows a flowchart of another example method for use with the method shown in FIG. 12, according to an example implementation.

FIG. 18 shows a flowchart of another example method for use with the method shown in FIG. 12, according to an example implementation. Blocks 614 and 616 are performed in accordance with block 606. At block 614, functions include comparing the unique aircraft identification number 308 associated with client aircraft 202 to a database of known unique aircraft identification numbers. For example, the ground service network may query the database 420 for a list of known unique aircraft identification numbers. At block 616, functions include determining, based on comparing the unique aircraft identification number 308 associated with the client aircraft 202 to the database of known unique aircraft identification numbers, that the unique aircraft identification number 308 associated with client aircraft 202 corresponds to a client aircraft 202 that is authorized to communicate with the ground service network 110. For example, the fixed router 112, or another node in the ground service network 110, may determine that the unique aircraft identification number 308 matches an identification number on the list that is designated as having permission to communicate over the ground service network 110.

Figure 19:
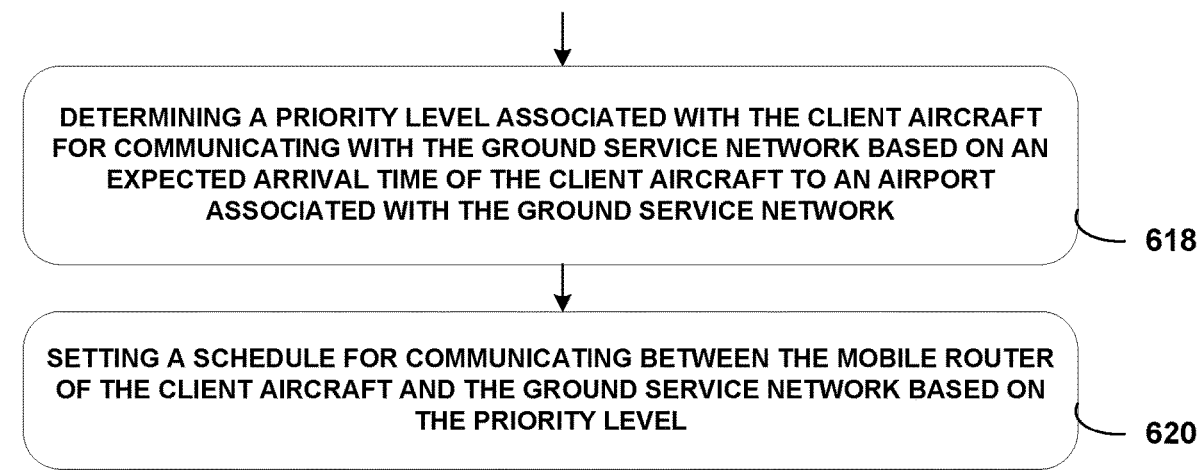
FIG. 19 shows a flowchart of another example method for use with the method shown in FIG. 12, according to an example implementation.

FIG. 19 shows a flowchart of another example method for use with the method shown in FIG. 12, according to an example implementation. At block 618, functions include determining a priority level associated with the client aircraft 202 for communicating with the ground service network based on an expected arrival time of the client aircraft 202 to an airport associated with the ground service network. The ground service network may determine the priority based on a threshold expected arrival time. For example, the ground service network may place a higher priority on client aircraft that are expected to arrive at the airport within 30 minutes of a current time, and place a lower priority on client aircraft that are expected to arrive later than 30 minutes from the current time.

At block 620, functions include setting a schedule for communicating between the mobile router 102 of the client aircraft 202 and the ground service network based on the priority level. In such examples, the configuration information for subsequent communications between the mobile router 102 of the client aircraft 202 and the ground service network may include the schedule for communicating between the mobile router 102 of the client aircraft 202 and the ground service network. Where the mobile router 102 has a low priority, the fixed router 112 might send a router advertisement message that advertises a low router preference for the mobile router 102 as an indication to the mobile router 106 that it may receive a degraded level of service. Where the mobile router 102 has a high priority, the fixed router 112 might send a router advertisement message that advertises a high router preference for the mobile router 102 as an indication to the mobile router 106 that it may receive a preferred level of service. Additionally or alternatively, the schedule may expedite communications between the mobile router 102 and the ground service network 110 based on a higher priority and may delay communications from mobile routers associated with client aircraft having a lower priority. The fixed router 112 may schedule communications in this way to manage bandwidth usage and network congestion. Thus, the fixed router 112 can efficiently configure communications between itself and multiple client aircraft based on an arrival context of the client aircraft.

The client aircraft 202 may also be configured to determine their priority status based on the received schedule. For example, a first schedule may be uniformly used for client aircraft at a first priority level, and a second schedule may be uniformly used for client aircraft at a second priority level. The client aircraft 202, or the mobile router 102, can thus determine the priority level associated with the client aircraft 202 based on the received communications schedule from the ground service network and react accordingly. For example, the mobile router 102 may elect not to provide further communications to the ground service network within an expiration lifetime for maintaining a communication status with the ground service network, and opt to send a second router solicitation message at a later time. Thus, additional information may be exchanged (e.g. a priority level of the client aircraft 202) without further communication.

Figure 20:
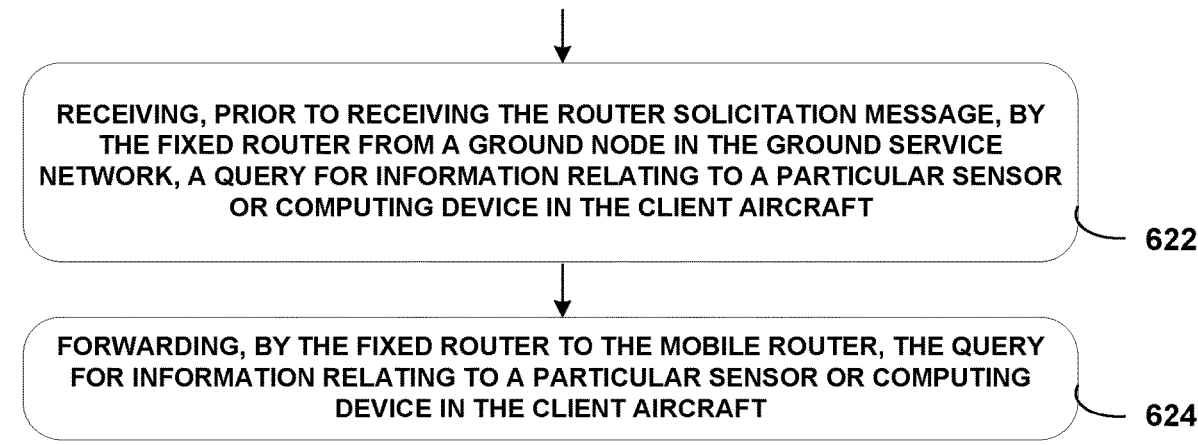
FIG. 20 shows a flowchart of another example method for use with the method shown in FIG. 12, according to an example implementation.

FIG. 20 shows a flowchart of another example method for use with the method shown in FIG. 12, according to an example implementation. At block 622, functions include receiving, prior to receiving the router solicitation message 300, by the fixed router 112 from a ground node 116 in the ground service network 110, query for information relating to a particular sensor or computing device in the client aircraft 202. For example, the ground node 416 may request GPS coordinates of the client aircraft 202 at a given time. At block 624, functions include forwarding, by the fixed router 112 to the mobile router 102, the query for information relating to a particular sensor or computing device in the client aircraft. For example, the fixed router 112 may forward the request for GPS coordinates of the client aircraft 202. In these examples, the mobile router 102 may act as a gateway for sensors and computing devices in the client aircraft 202. Thus, the ground service network and the mobile router 102 may serve to provide IoT functionality of the client aircraft 202.

Figure 21:
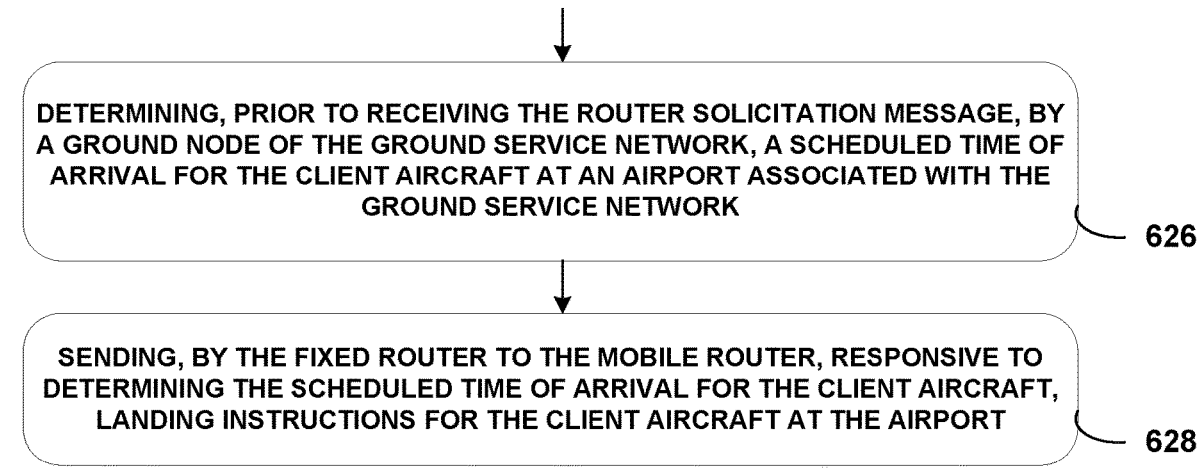
FIG. 21 shows a flowchart of another example method for use with the method shown in FIG. 12, according to an example implementation.

FIG. 21 shows a flowchart of another example method for use with the method shown in FIG. 12, according to an example implementation. At block 626, functions include determining, prior to receiving the router solicitation message 300, by the a ground node 416 of the ground service network 110, a scheduled time of arrival for the client aircraft 202 at an airport associated with the ground service network. For example, the ground node 416 may request an arrival schedule from the scheduling system 418, and determine the scheduled time of arrival for the client aircraft 202 based on a schedule provided by the scheduling system 418. At block 628, functions include sending, by the fixed router 112 to the mobile router 102, responsive to determining the scheduled time of arrival for the client aircraft, landing instructions for the client aircraft at the airport. The landing instructions may correspond to a particular flight number, client aircraft type, or a unique aircraft identification number 308. Further the landing instructions may be sent to the client aircraft 202 without receiving a request for the landing instructions from the mobile router 102. In this fashion, the ground service network may provide additional information relevant to the client aircraft 202 automatically in response to receiving the router solicitation message 300, and may thus further reduce communications.

Within the examples described herein, a mobile router and a fixed router in a ground service network may automatically configure subsequent communications. This reduces network congestion and bandwidth usage within the ground service network and reduces computing power required to process additional communications. In addition, context-based implied information exchange between mobile routers and ground service networks allows for further reduction in subsequent communications. In addition, IoT capabilities associated with using a mobile router as a gateway for sensors and computing devices within a client aircraft allow for robust and flexible communication between ground nodes and the client aircraft.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for automatically configuring communications between a client aircraft and a ground service network, the method comprising:

forming a Mobile Network Prefix (MNP) uniquely associated with the client aircraft, wherein forming the MNP comprises combining (i) a Mobility Service Prefix (MSP) associated with the ground service network, and (ii) a unique aircraft identification number associated with the client aircraft;

embedding, by a mobile router of the client aircraft, the MNP in a source address, wherein the source address corresponds to a protocol for communicating over the ground service network, and wherein corroboration of the unique aircraft identification number by one or more nodes in the ground service network indicates that the client aircraft has permission to communicate over the ground service network;

sending, by the mobile router of the client aircraft, a router solicitation message to the ground service network, wherein the router solicitation message comprises the source address;

receiving, by the mobile router of the client aircraft from a fixed router in the ground service network, a router advertisement message, wherein the router advertisement message comprises configuration information for subsequent communications between the mobile router of the client aircraft and nodes in the ground service network;

determining, by the mobile router of the client aircraft, based on receiving the router advertisement message, that (i) the MNP of the client aircraft has been delegated and (ii) the client aircraft has permission to communicate over the ground service network; and sending, by the mobile router of the client aircraft, responsive to determining that the client aircraft has permission to communicate over the ground service network, a subsequent message to the fixed router in the ground service network in accordance with the configuration information of the router advertisement message.

2. The method of claim 1, wherein determining, based on receiving the router advertisement message, that the client aircraft has permission to communicate over the ground service network, comprises determining that the client aircraft has permission to communicate over the ground service network upon receipt of the router advertisement message.

3. The method of claim 1, the method further comprising:
initiating a landing sequence of the client aircraft at an airport associated with the ground service network,
wherein sending, by the mobile router of the client aircraft, the router solicitation message to the fixed router comprises sending the router solicitation message to the fixed router of the ground service network responsive to initiating the landing sequence of the client aircraft.

4. The method of claim 1, further comprising:
receiving, by the mobile router of the client aircraft from the fixed router, a status query corresponding to a component of the client aircraft;
communicating, by the mobile router via an intra-client aircraft network, based on receiving the status query, with one or more sensors or computing devices in the intra-client aircraft network; and
sending, by the mobile router, based on communicating with the one or more sensors or computing devices, sensor data or parameter values responsive to the status query to the fixed router in the ground service network.

5. The method of claim 1, wherein the subsequent message comprises an indication of a failure state of a component of the client aircraft, the method further comprising:
receiving, by the mobile router of the client aircraft from the fixed router, a query for sensor data or parameter values related to the indication of the failure state;
communicating, by the mobile router via an intra-client aircraft network, based on receiving the query for sensor data or parameter values, with one or more sensors or computing devices in the intra-client aircraft network corresponding to the sensor data or parameter values; and
sending, by the mobile router, based on communicating with the one or more sensors or computing devices, the sensor data or parameter values to the fixed router.

6. The method of claim 1, further comprising communicating over the ground service network in accordance with Internet Protocol version 6 (IPv6), wherein forming the MNP uniquely associated with the client aircraft comprises forming the MNP based on a predetermined number of bits associated with the unique aircraft identification number.

7. The method of claim 1, wherein the configuration information for subsequent communication between the mobile router of the client aircraft and the fixed router comprises a keep-alive timer for maintaining a communication state between the mobile router of the client aircraft and the fixed router, and wherein sending the subsequent message to the fixed router comprises sending the subsequent message within a time threshold of the keep-alive timer.

8. The method of claim 1, further comprising:
determining, based on a flight plan of the client aircraft, a proximity between the client aircraft and a destination airport; and
determining that the proximity between the client aircraft and the destination airport is within a threshold distance,
wherein sending the router solicitation message to the fixed router in the ground service network comprises sending the router solicitation message to the fixed router responsive to determining that the proximity between the client aircraft and the destination airport is within the threshold distance.

9. The method of claim 1, wherein the mobile router serves as a gateway node between sensors and computing devices in the client aircraft and ground nodes in the ground service network, and wherein the method further comprises:
communicating, by the mobile router, with the sensors and computing devices in accordance with the protocol for communicating over the ground service network.

10. The method of claim 1, wherein sending the subsequent message to the fixed router in the ground service network comprises sending a query for landing instructions to be forwarded to an air traffic control node in the ground service network, the method further comprising:
receiving, by the mobile router of the client aircraft from the fixed router, a forwarded message from the air traffic control node containing landing instructions.

11. The method of claim 1, wherein the fixed router serves as a gateway for a ground node in the ground service network, and wherein sending the subsequent message to the fixed router comprises sending a request for (i) information relating to the ground node or (ii) a source address associated with the ground node.

12. A method for automatically configuring communications between a client aircraft and a ground service network, the method comprising:
receiving, by a fixed router in the ground service network from a mobile router of the client aircraft, a router solicitation message,
wherein the router solicitation message comprises a source address corresponding to a protocol for communicating over the ground service network and having embedded therein an MNP formed by combining (i) a Mobility Service Prefix (MSP) associated with the ground service network, and (ii) a unique aircraft identification number associated with the client aircraft;
delegating, by the fixed router in the ground service network, the MNP;
corroborating, by one or more nodes in the ground service network, the unique aircraft identification number to determine that the client aircraft has permission to communicate over the ground service network;
sending, by the fixed router of the ground service network to the mobile router of the client aircraft, a router advertisement message, wherein the router advertisement message comprises configuration information for subsequent communications between the mobile router of the client aircraft and nodes in the ground service network, wherein receiving the router advertisement message by the mobile router of the client aircraft indicates that (i) the MNP of the client aircraft has been delegated and (ii) the client aircraft has permission to communicate over the ground service network; and
receiving, by the mobile router of the client aircraft, responsive to determining that the client aircraft has permission to communicate over the ground service network, a subsequent message to the fixed router in accordance with the configuration information of the router advertisement message.

13. The method of claim 12, wherein determining the unique aircraft identification number from the MNP comprises extracting the MNP from the source address based on a predetermined number of bits associated with unique aircraft identification number.

14. The method of claim 12, wherein corroborating the unique aircraft identification number comprises:
comparing the unique aircraft identification number associated with the client aircraft to a database of known unique aircraft identification numbers; and
determining, based on comparing the unique aircraft identification number associated with the client aircraft to the database of known unique aircraft identification numbers, that the unique aircraft identification number associated with the client aircraft corresponds to a client aircraft that is authorized to communicate with the ground service network.

15. The method of claim 12, further comprising:
determining a priority level associated with the client aircraft for communicating with the ground service network based on an expected arrival time of the client aircraft to an airport associated with the ground service network; and
setting a schedule for communicating between the mobile router of the client aircraft and the ground service network based on the priority level,
wherein the configuration information for subsequent communications between the mobile router of the client aircraft and the ground service network comprises the schedule for communicating between the mobile router of the client aircraft and the ground service network.

16. The method of claim 12, further comprising:
receiving, prior to receiving the router solicitation message, by the fixed router from a ground node in the ground service network, a query for information relating to a particular sensor or computing device in the client aircraft; and
forwarding, by the fixed router to the mobile router, the query for information relating to a particular sensor or computing device in the client aircraft.

17. The method of claim 12, further comprising:
determining, prior to receiving the router solicitation message, by a ground node of the ground service network, a scheduled time of arrival for the client aircraft at an airport associated with the ground service network; and
sending, by the fixed router to the mobile router, responsive to determining the scheduled time of arrival for the client aircraft, landing instructions for the client aircraft at the airport.

18. A non-transitory computer readable medium having stored thereon instructions, that when executed by one or more processors of a computing device, cause the computing device to perform functions comprising:
forming a Mobile Network Prefix (MNP) uniquely associated with a client aircraft, wherein forming the MNP comprises combining (i) a Mobility Service Prefix (MSP) associated with a ground service network, and (ii) a unique aircraft identification number associated with the client aircraft;
embedding, by a mobile router of the client aircraft, the MNP in a source address, wherein the source address corresponds to a protocol for communicating over the ground service network, and wherein corroboration of the unique aircraft identification number by one or more nodes in a ground service network indicates that the client aircraft has permission to communicate over the ground service network;
sending, by the mobile router of the client aircraft, a router solicitation message to the ground service network, wherein the router solicitation message comprises the source address;
receiving, by the mobile router of the client aircraft from a fixed router in the ground service network, a router advertisement message, wherein the router advertisement message comprises configuration information for subsequent communications between the mobile router of the client aircraft and nodes in the ground service network;
determining, by the mobile router of the client aircraft, based on receiving the router advertisement message, that (i) the MNP of the client aircraft has been delegated and (ii) the client aircraft has permission to communicate over the ground service network; and
sending, by the mobile router of the client aircraft, responsive to determining that the client aircraft has permission to communicate over the ground service network, a subsequent message to the fixed router in the ground service network in accordance with the configuration information of the router advertisement message.

19. The non-transitory computer readable medium of claim 18, wherein determining, based on receiving the router advertisement message, that the client aircraft has permission to communicate over the ground service network, comprises determining that the client aircraft has permission to communicate over the ground service network upon receipt of the router advertisement message.

20. The non-transitory computer readable medium of claim 18, the functions further comprising:
receiving, by the mobile router of the client aircraft from the fixed router, a status query corresponding to a component of the client aircraft;
communicating, by the mobile router via an intra-client aircraft network, based on receiving the status query, with one or more sensors or computing devices in the client aircraft; and
sending, by the mobile router to the fixed router in the ground service network, based on communicating with the one or more sensors or computing devices, sensor data or parameter values responsive to the status query.

21. A system for automatically configuring communications between a client aircraft and a ground service network comprising:
a mobile router of the client aircraft, wherein the mobile router comprises a computing device having a processor and memory storing instructions executable by the processor to:
form a Mobile Network Prefix (MNP) uniquely associated with the client aircraft, wherein forming the MNP comprises combining (i) a Mobility Service Prefix (MSP) associated with the ground service network, and (ii) a unique aircraft identification number associated with the client aircraft;
embed the MNP in a source address, wherein the source address corresponds to a protocol for communicating over the ground service network, and wherein corroboration of the unique aircraft identification number by one or more nodes in the ground service network indicates that the client aircraft has permission to communicate over the ground service network;
send a router solicitation message to a fixed router of the ground service network, wherein the router solicitation message comprises the source address, receive, from the fixed router in the ground service network, a router advertisement message, wherein the router advertisement message comprises configuration information for subsequent communications between the mobile router of the client aircraft and nodes in the ground service network;

determine, based on receiving the router advertisement message, that (i) the MNP of the client aircraft has been delegated and (ii) the client aircraft has permission to communicate over the ground service network; and send, responsive to determining that the client aircraft has permission to communicate over the ground service network, a subsequent message to the fixed router in the ground service network in accordance with the configuration information of the router advertisement message.

\* \* \* \* \*